United States Patent
Nishiguchi et al.

(10) Patent No.: US 8,555,028 B2
(45) Date of Patent: Oct. 8, 2013

(54) COMPUTER-READABLE, NON-TRANSITORY MEDIUM STORING MEMORY ACCESS CONTROL PROGRAM, MEMORY ACCESS CONTROL METHOD, AND INFORMATION PROCESSING APPARATUS

(75) Inventors: Naoki Nishiguchi, Kawasaki (JP); Noboru Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 13/219,809

(22) Filed: Aug. 29, 2011

(65) Prior Publication Data

US 2012/0072669 A1    Mar. 22, 2012

(30) Foreign Application Priority Data

Sep. 21, 2010   (JP) .................................. 2010-211167

(51) Int. Cl.
*G06F 12/10* (2006.01)
(52) U.S. Cl.
USPC .......................................... 711/207; 711/163
(58) Field of Classification Search
None
See application file for complete search history.

(56) References Cited

U.S. PATENT DOCUMENTS

| 2004/0148480 A1* | 7/2004 | Watt et al. ...................... 711/163 |
| 2004/0177261 A1* | 9/2004 | Watt et al. ...................... 713/193 |
| 2007/0101099 A1 | 5/2007 | Shinohara et al. |
| 2008/0244206 A1 | 10/2008 | Heo et al. |
| 2011/0161620 A1* | 6/2011 | Kaminski et al. ............. 711/207 |
| 2011/0238947 A1* | 9/2011 | Nishiguchi et al. ........... 711/207 |

FOREIGN PATENT DOCUMENTS

JP        2007-122305        5/2007

OTHER PUBLICATIONS

Nakajima, et al., "X86-64 XenLinux: Architecture, Implementation, and Optimizations", Proceedings of the Linux Symposium, vol. 2, pp. 173-184, Jul. 2006.

* cited by examiner

*Primary Examiner* — Than Nguyen
(74) *Attorney, Agent, or Firm* — Staas & Halsey LLP

(57) ABSTRACT

A method of causing an information processing apparatus to execute, the method including: performing a management procedure to accept addresses of respective page tables generated for each of operation modes from an operating system that manages the virtual address space and to associate the addresses with the operating system to be recorded in page table correspondence information storage; executing a control procedure to set a second access right indicating a value lower than the first access right in accordance with the operation mode of the operating system; and processing a processing procedure to cause the memory management device to execute a flush of a translation look-aside buffer, and to set the second access right indicating a value for validating the first access right, wherein the memory management device performs a control on the memory access while the second access right is prioritized over the first access right.

15 Claims, 27 Drawing Sheets

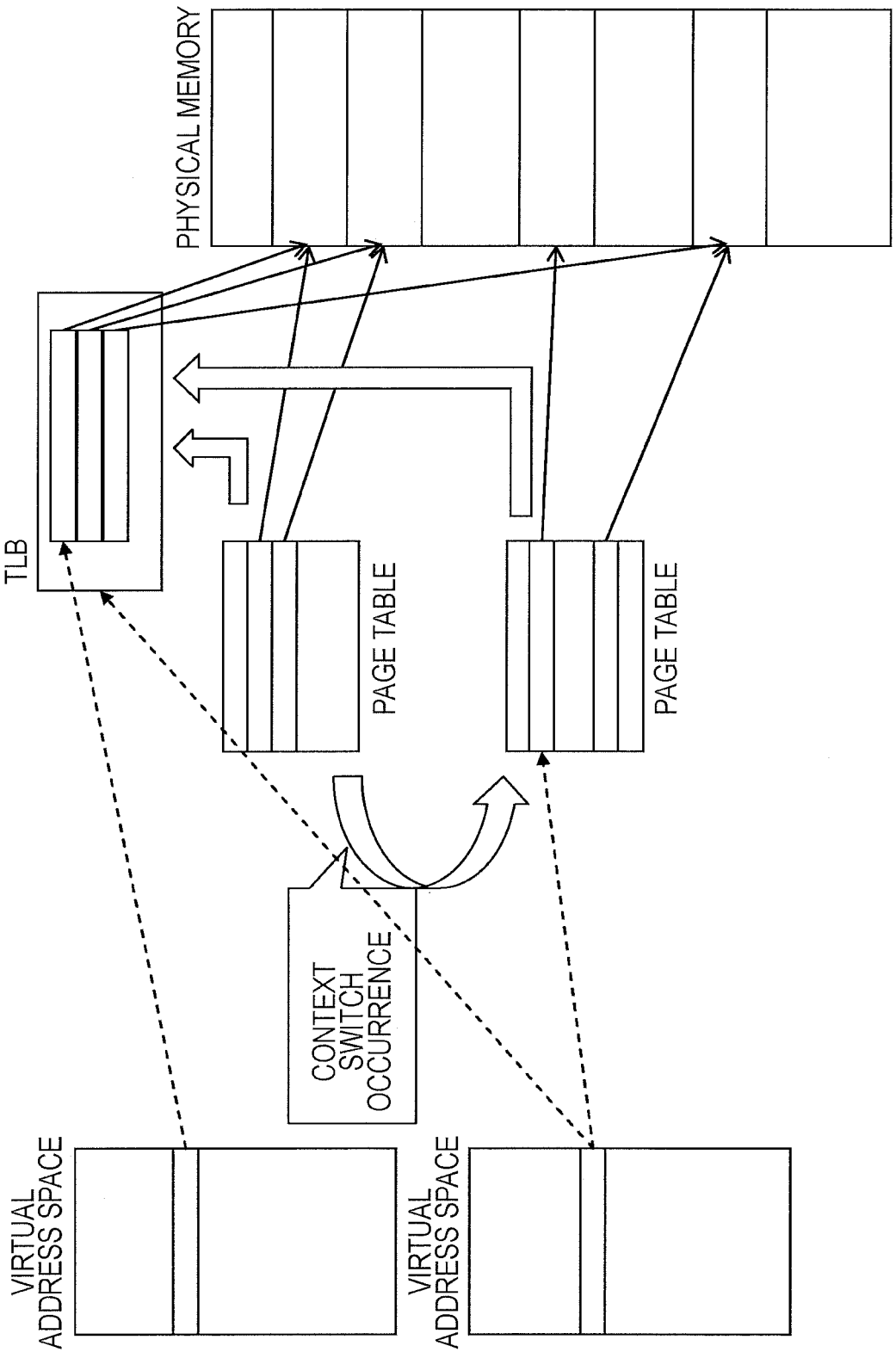

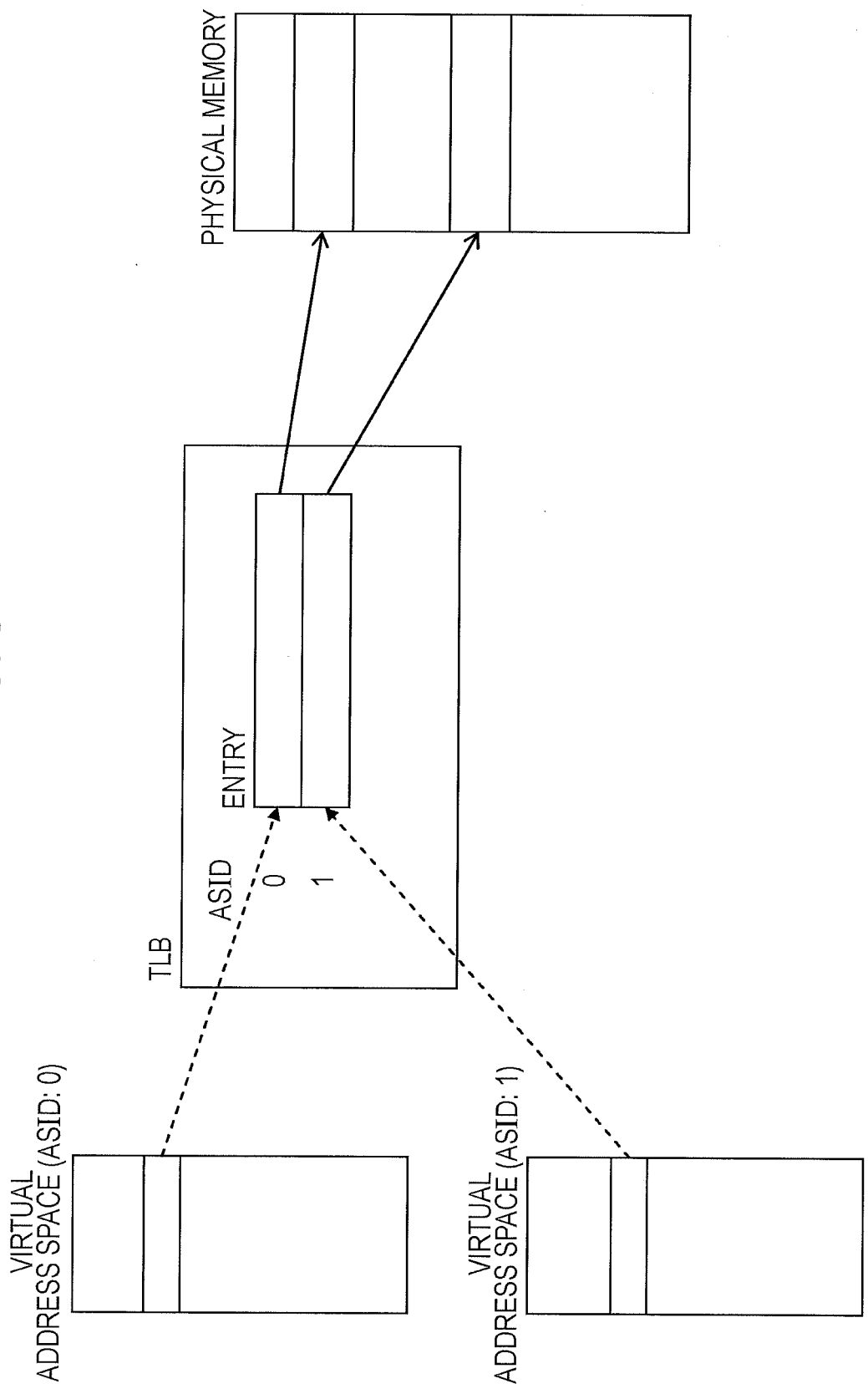

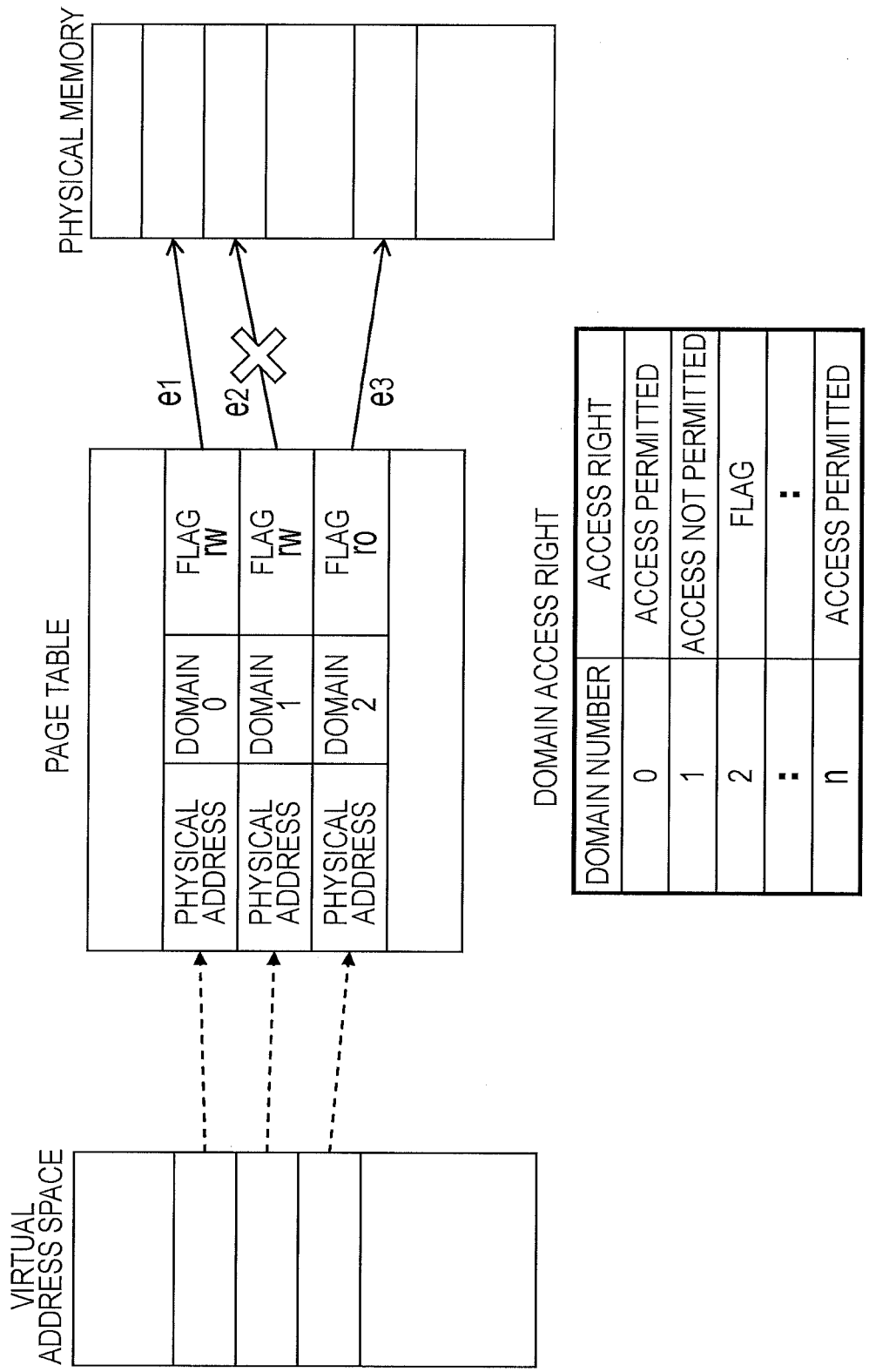

FIG. 5A

| | PATTERN 1 | PATTERN 2 |
|---|---|---|
| ACCESS RIGHT OF USER MODE | ACCESS FORBIDDEN | READ PERMITTED |
| ACCESS RIGHT OF KERNEL MODE | READ WRITE PERMITTED | READ PERMITTED |

FIG. 5B

| | SETTING FOR PATTERN 1 | | SETTING FOR PATTERN 2 | |
|---|---|---|---|---|
| ACCESS RIGHT OF PAGE TABLE | ACCESS FORBIDDEN | ANY | READ PERMITTED | |
| DOMAIN SETTING OF USER MODE | FLAG | ACCESS NOT PERMITTED | READWRITE PERMITTED | FLAG |
| DOMAIN SETTING OF KERNEL MODE | ACCESS PERMITTED | ACCESS PERMITTED | FLAG/ ACCESS PERMITTED | FLAG |

FIG. 6

| VALID PAGE TABLE | | OPERATION MODE OF GUEST OS | |
|---|---|---|---|
| | | USER MODE | KERNEL MODE |
| PAGE TABLE FOR USER | | FLAG | FLAG |
| PAGE TABLE FOR KERNEL | | ACCESS NOT PERMITTED | FLAG |

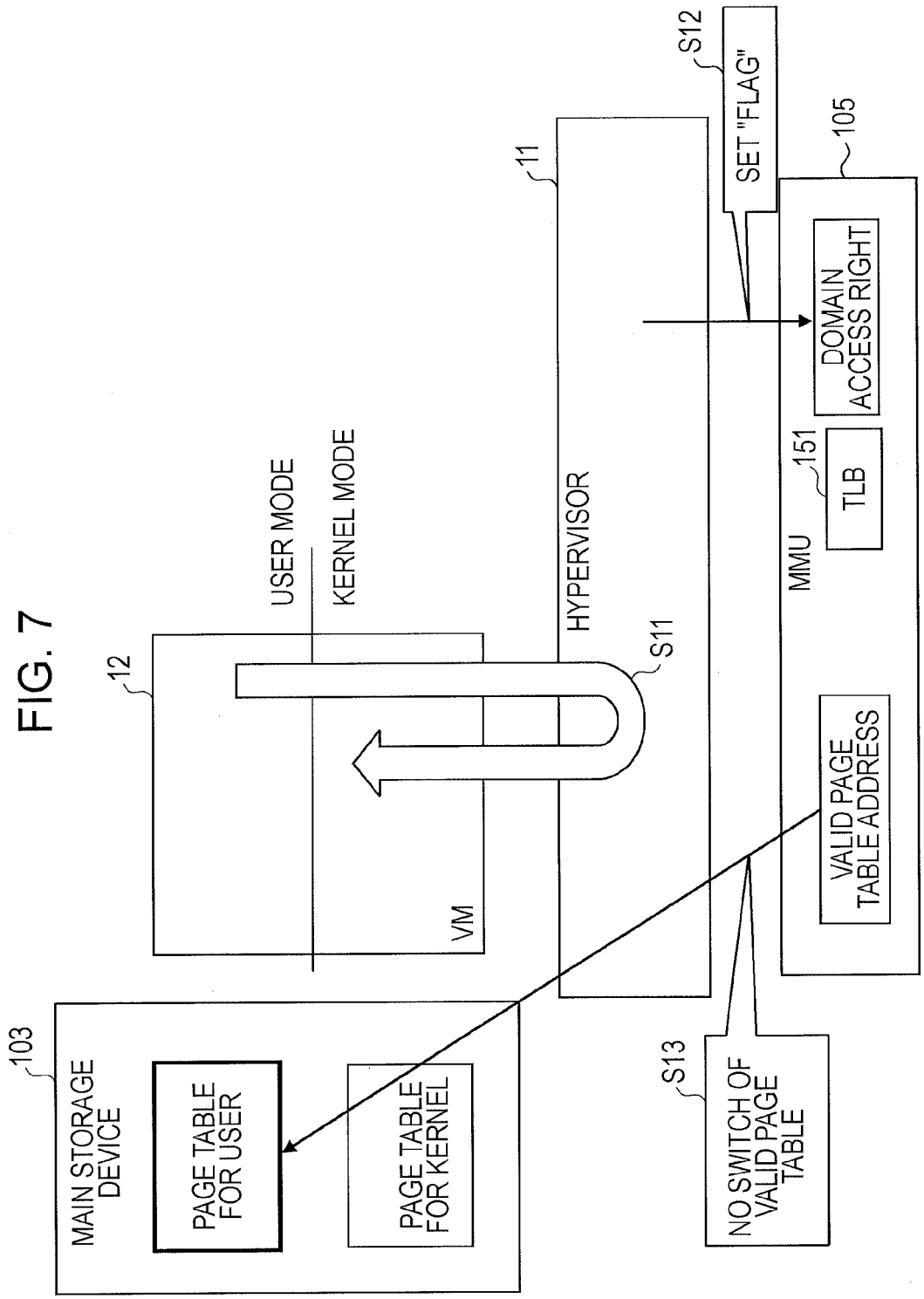

FIG. 8A

| OPERATION MODE | ACCESS RIGHT OF PAGE TABLE | | | |
|---|---|---|---|---|
| USER MODE | rw | ro | no | no |
| KERNEL MODE | rw | rw | ro | ro |

FIG. 8B

| VALID PAGE TABLE | OPERATION MODE | APPLIED ACCESS RIGHT | | | | | |
|---|---|---|---|---|---|---|---|
| PAGE TABLE FOR USER | USER MODE | rw | rw | ro | ro | no | no |
| PAGE TABLE FOR USER | KERNEL MODE | rw | rw | ro | no | no | no |
| PAGE TABLE FOR KERNEL | USER MODE | no | no | no | no | no | no |
| PAGE TABLE FOR KERNEL | KERNEL MODE | rw | rw | rw | ro | ro | ro |

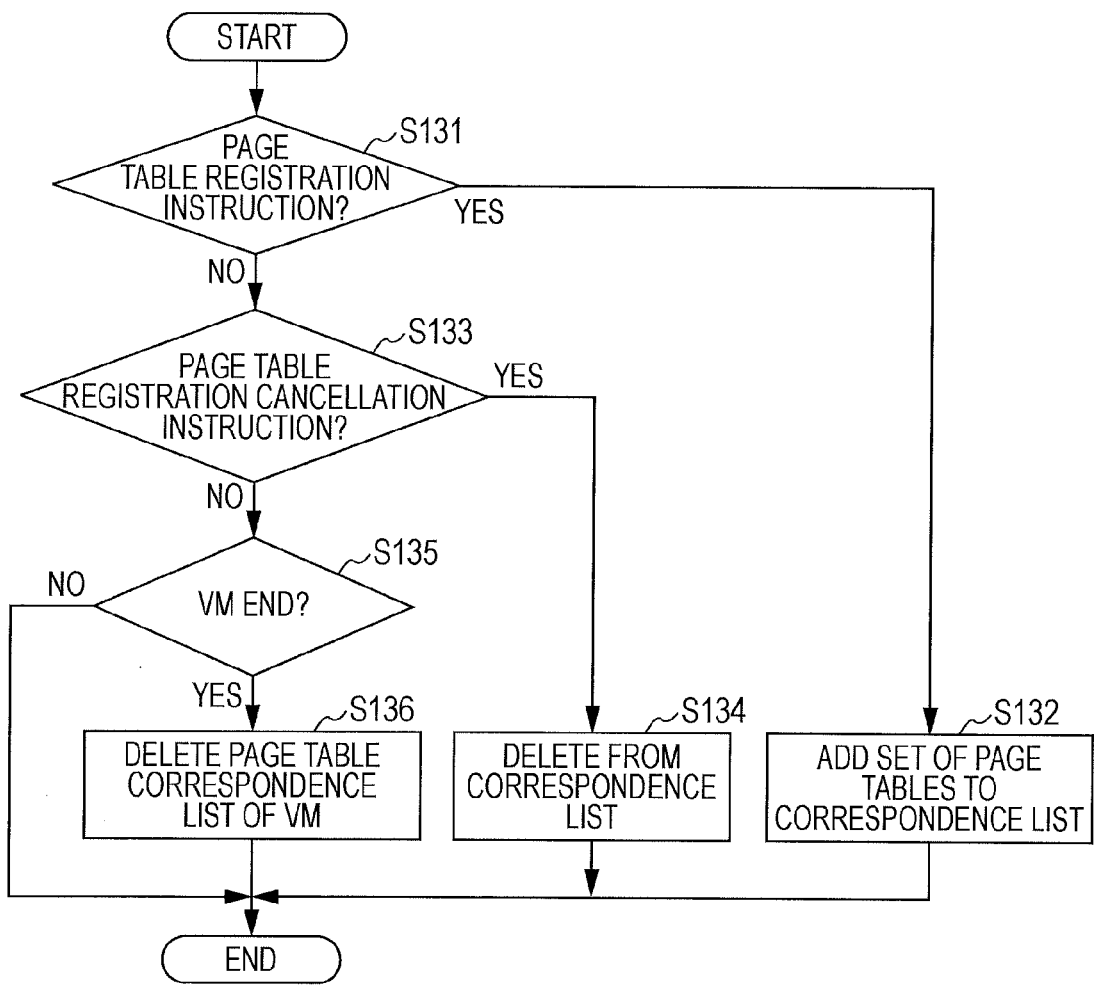

FIG. 26

| VMID | DOMAIN NUMBER | GLOBAL FLAG | ... |
|------|---------------|-------------|-----|

FIG. 28

| VALID PAGE TABLE | OPERATION MODE OF GUEST OS | |
|---|---|---|
| | USER MODE | KERNEL MODE |
| FOR USER AND USER | FLAG | FLAG |
| FOR USER AND KERNEL | FLAG | FLAG |
| FOR KERNEL AND KERNEL | ACCESS NOT PERMITTED | FLAG |
| FOR KERNEL AND USER | ACCESS NOT PERMITTED | FLAG |

FIG. 30

| VMID | PAGE TABLE ADDRESS FOR USER AND USER | PAGE TABLE ADDRESS FOR USER AND KERNEL | PAGE TABLE ADDRESS FOR KERNEL AND KERNEL | PAGE TABLE ADDRESS FOR KERNEL AND USER | CURRENT PAGE TABLE ADDRESS |
|---|---|---|---|---|---|

COMPUTER-READABLE, NON-TRANSITORY MEDIUM STORING MEMORY ACCESS CONTROL PROGRAM, MEMORY ACCESS CONTROL METHOD, AND INFORMATION PROCESSING APPARATUS

CROSS REFERENCE TO RELATED APPLICATION

This application is based upon and claims the benefit of priority from the prior Japanese Patent Application NO. 2010-211167 filed on Sep. 21, 2010, the entire contents of which are incorporated herein by reference.

FIELD

The embodiments discussed herein are related to a memory access control program, a memory access control method, and an information processing apparatus.

BACKGROUND

FIG. 1 is an explanatory diagram for describing an example of a translation system from a virtual address to a physical address in related art.

As illustrated in the same drawing, a translation from the virtual address to the physical address is realized by using a page table. The page table is data in which mapping information between a virtual address of a corresponding process and a physical address such as a main storage device is stored in units of pages. That is, one entry of the page table corresponds to one page. The respective entries store an access right and the like for each privilege level (for example, a privilege mode, a non-privilege mode) with respect to the corresponding page. Depending on an architecture, a block of some pages may also be represented by one entry. In FIG. 1, the example has been described in which a translation into a physical memory is performed only by the entry of the page table, but in typically, the page table is hierarchically used to carry out a translation from the virtual address to the physical address.

An address translation using the page table is performed by an MMU (Memory Management Unit). That is, through an occurrence of a context switch, in the MMU, an address of the page table corresponding to the currently executed process is set. The MMU refers to a page table related to the relevant address and executes the address translation. It is noted that the page table is stored in the main storage device or the like, and a cost with respect to the access is high. In view of the above, in general, a TLB (Translation Look-aside Buffer) is used, and an increase in a substantial access speed to the page table is realized.

FIG. 2 is an explanatory diagram for describing an example of a translation system using the TLB from the virtual address to the physical address. The TLB is a cache of the entry of the page table. As the TLB is mounted in the MMU, if an entry corresponding to an address of a translation target exists in the TLB, speeding-up of the address translation is carried out.

It is noted that addresses of the respective virtual spaces may be duplicated. Therefore, an address that may be cached in the TLB around the same time is limited to an entry of the page table of the processing currently in execution. In view of the above, in accordance with the occurrence of the context switch, a content of the TLB is flushed.

To avoid the flush of the TLB and realize a further improvement in the performance, an architecture using the address space ID (ASID (Address Space Identifier)) also exists. The ASID refers to an identifier with respect to a virtual address space of the respective processes.

FIG. 3 is an explanatory diagram for describing an example of a translation system using the ASID from the virtual address to the physical address. In the same drawing, the ASID of one virtual address is set as "0", and the ASID of the other virtual address is set as "1". In the architecture where the ASID is valid, in the TLB, the respective entries are assigned with the ASIDs to be managed. Therefore, in the TLB, coexistence of the entries of the page tables corresponding to different processes may be realized. As a result, it is possible to avoid the flush of the TLB in accordance with the occurrence of the context switch.

Thus far, the example of the scheme of the address translation system in related art has been described which becomes a presupposition in the following description.

In the meantime, in recent years, a performance of a CPU used in an embedded device (for example, a mobile phone) is being improved. As a result, in such a CPU, it is being possible to operate a plurality of OSs through virtualization. It is noted that the embedded device uses a CPU specialized for the embedded device instead of a CPU supporting the virtualization like a CPU for a PC or a server. To elaborate, the CPU in the embedded device may realize the virtualization in terms of performance but requests a complement by software in terms of function.

For example, an operation mode of the CPU in the embedded device has only a distinction between the privilege mode and the non-privilege mode. The privilege mode is used as a mode at the time of an operation of a kernel in the OS, and the non-privilege mode is used as a mode at the time of an operation of a user task. However, in a case where the virtualization is carried out, the privilege mode is used by a hypervisor. Therefore, the access right with respect to the virtual access space needs to be distinguished in the non-privilege mode between the time of the operation of the kernels in the respective guest OSs (hereinafter, which will be referred to as "kernel mode") and the time of the operation of the user task (hereinafter, which will be referred to as "user mode"). This is because a memory access protection in accordance with the kernel mode and the user mode is to be realized. It is noted that the hypervisor refers to a program for realizing a virtual machine where a physical computer is virtualized. The guest OS refers to an OS operating on the virtual machine realized by the hypervisor.

As a scheme for distinguishing the kernel mode and the user mode in the non-privilege mode, up to now, the following methods are discussed.

According to a first method, two page tables are prepared for one process. One of the two page tables is set as a page table at the time when the guest OS operates in the kernel mode. That is, in the respective entries of the relevant page table, as the access right in the non-privilege mode, the access right with respect to the kernel mode is set. The other one of the two page tables is set as a page table at the time when the guest OS operates in the user mode. That is, in the respective entries of the relevant page table, as the access right in the non-privilege mode, the access right with respect to the user mode is set. The hypervisor detects a switch of the operation mode of the guest OS (the kernel mode/the user mode) and sets the address of the page table corresponding to the switch destination mode in the MMU. As a result, with respect to the non-privilege mode, the two operation modes including the kernel mode and the user mode may be substantially realized.

However, according to the first method, each time the switch between the kernel mode and the user mode is performed, it is requested to flush the TLB. This is because in the TLB, the entry of the page table for the kernel mode and the entry of the page table for the user mode may not be distinguished from each other.

According to a second method, pages are sorted through a concept of domains, and by setting access rights in units of domains, the distinction between the kernel mode and the user mode of the guest OS in the non-privilege mode of the CPU is realized.

FIG. 4 is an explanatory diagram for describing a scheme of a setting on an access right utilizing a domain. In the page table in the same drawing, with regard to items of three entries e1 to e3 (a physical address, a domain, and a flag), specific values are exemplified. The physical address is a physical address with respect to a virtual address related to the entry. The domain is a number of the domain to which the page belongs. In the same drawing, the domain numbers have values of 0 to n. The flag is a flag indicating an access right with respect to the page in the non-privilege mode.

In the same drawing, for a setting of the access right with respect to the domain (domain setting), an example is illustrated in which access permitted, access not permitted, flag, access permitted are respectively set to domains 0, 1, 2, and n.

In this case, with regard to the page related to the entry e1 belonging to the domain 0, irrespectively of a value of the flag for the entry e1, the access is permitted. With regard to the page related to the entry e2 belonging to the domain 1, irrespectively of a value of the flag for the entry e2, the access is forbidden. With regard to the page related to the entry e3 belonging to the domain 2, the access right is determined while following a value of the flag.

By utilizing the domain setting in which overwrite may be performed on the access rights of the page table in this manner, it is possible to change the access rights with respect to the respective pages while the same page table is used. That is, by changing the domain setting with the kernel mode and the user mode, without flushing the TLB, it is possible to realize the access protection of the memory in accordance with the respective operation modes. It is noted that as an architecture adopting the domain, an ARM architecture exists.

U.S. Laid-open Patent Publication No. 2008/0244206, Japanese Laid-open Patent Publication No. 2007-122305, and "Jun Nakajima, Asit Mallick, Ian Pratt, Keir Fraser, "X86-64 XenLinux: Architecture, Implementation, and Optimizations", in *Proceedings of the Linux Symposium*, July 2006" are examples of related art.

However, according to the second method, in one domain, all the combinations of the access rights with the kernel mode and the user mode may not be realized, and a problem of a lack of flexibility occurs.

FIG. 5A and FIG. 5B are explanatory diagrams for describing a problem of a second method. FIG. 5A illustrates two realized patterns in one domain with regard to combinations of the user mode and the kernel mode with the access rights. In a pattern 1, the access right of the user mode is "access forbidden", and the access right of the kernel mode is "read write permitted". In a pattern 2, the access right of the user mode and the access right of the kernel mode are both "read permitted". It is noted that a state in which the pattern 1 and the pattern 2 are realized in one domain means that the pattern 1 is realized for a certain page belonging to the same domain and the pattern 2 is realized for any of the other pages.

FIG. 5B illustrates contents of the setting on the access rights with respect to the non-privilege mode of the page table and the domain setting for realizing the respective patterns of FIG. 5A. It is noted that as the domain setting is switched between the user mode and the kernel mode, the setting contents are respectively illustrated.

In FIG. 5B, the setting for the pattern 1 is a setting content for realizing the pattern 1. In the setting for the pattern 1, a value that may be set as the access right of the page table is "access forbidden", "any", or "read write permitted". It is noted that "any" means any access right may be adopted.

In a case where "access forbidden" is set in the page table, to realize the pattern 1, it is requested that the domain setting of the user mode is "flag" and the domain setting of the kernel mode is "access permitted". In this case, the access right of the user mode becomes "access forbidden" that is the access right of the page table, and the access right of the page table is overwritten on the access right of the kernel mode to become "access permitted (=read write permitted)". Therefore, the pattern 1 is realized.

In a similar concept, in a case where the access right of the page table is "any", it is requested that the domain setting of the user mode is "access not permitted" and the domain setting of the kernel mode is "access permitted". Also, in a case where the access right of the page table is "read write permitted", it is requested that the domain setting of the user mode is "access not permitted" and the domain setting of the kernel mode is "flag" or "access permitted".

In FIG. 5B, the setting for the pattern 2 is a setting content for realizing the pattern 2. In the setting for the pattern 2, a value that may be set as the access right of the page table is limited to "read permitted". In this case, to realize the pattern 2, it is requested that the domain settings on both the user mode and the kernel mode are "flag".

At this time, the content of the domain setting in the setting for the pattern 1 and the content of the domain setting in the setting for the pattern 2 are compared with each other, the setting contents that are common in both the settings do not exist. Therefore, the content of FIG. 5A may not be realized in one domain accordingly.

It is noted that Patent Documents proposes that with respect to the operation mode of the guest OS, the page table and the ASID are allocated, and in accordance with a switch instruction of the operation mode from the guest OS, by switching the page table and the ASID, the TLB flush at the time of the mode switch is avoided.

However, as the operation mode of the guest OS does not suppose a pair like the user mode and the kernel mode, the hypervisor may not forcibly perform the switch to the kernel mode instead of the instruction from the guest OS.

SUMMARY

According to one aspect of the embodiments, there is the memory access control method of causing an information processing apparatus to execute. The method including performing a page table management procedure configured to accept addresses of respective page tables generated for each of operation modes having different privilege levels where a first access right in accordance with the relevant operation mode is set with respect to one virtual address space, from an operating system that manages the virtual address space and configured to associate the addresses with the operating system to be recorded in page table correspondence information storage; executing a context switch control procedure configured to set a second access right indicating a value lower than or equal to the first access right in accordance with the operation mode where the first access right is relatively small, in a memory management device in accordance with a switch of the operation mode of the operating system; and processing a fault processing procedure configured to set, in accordance with an memory access beyond the second access right, the address corresponding to the current operation mode in the memory management device, configured to cause the memory management device to execute a flush of a translation look-aside buffer, and configured to set the second access right indicating a value for validating the first access right set in the page table related to the relevant address in the memory management device, wherein the memory management device performs a control on the memory access while the second access right is prioritized over the first access right related to the page table where the address is set in the memory management device.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 2 is an explanatory diagram for describing an example of a translation system utilizing a TLB from the virtual address to the physical address.

FIG. 3 is an explanatory diagram for describing an example of a translation system utilizing an ASID from the virtual address to the physical address.

FIG. 4 is an explanatory diagram for describing a scheme of a setting on an access right utilizing a domain.

FIG. 5A and FIG. 5B are explanatory diagrams for describing a problem of a second method.

FIG. 6 is an explanatory diagram for describing a decision method for a domain access right according to a first embodiment.

FIG. 7 is an explanatory diagram for describing an example of a processing content at the time of an operation mode switch according to the first embodiment.

FIG. 8A and FIG. 8B are explanatory diagrams for describing a case in which a fault is generated with respect to a memory access that is permitted.

FIG. 16 is a flow chart for describing a processing procedure executed by a page table management unit according to the first embodiment.

FIG. 17 illustrates a configuration example of an entry of a page table correspondence list according to the first embodiment.

FIG. 26 illustrates a configuration example of an entry of an extended domain utilization list.

FIG. 28 is an explanatory diagram for describing a decision method for a domain access right according to the third embodiment.

FIG. 30 illustrates a configuration example of the entry of the page table correspondence list according to the third embodiment.

DESCRIPTION OF EMBODIMENTS

Figure 1:
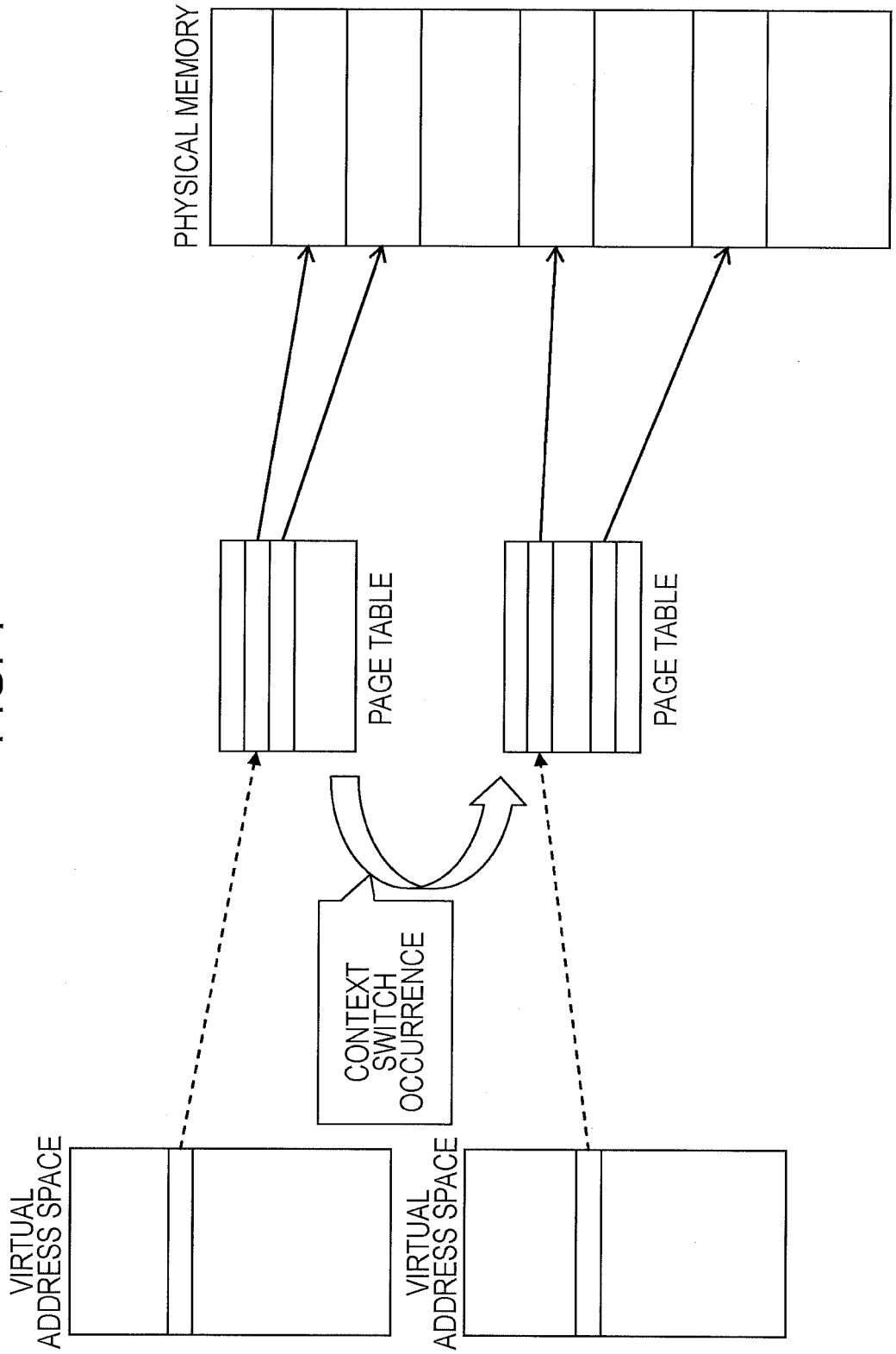
FIG. 1 is an explanatory diagram for describing an example of a translation system from a virtual address space to a physical address space in related art.

Hereinafter, embodiments of the present invention will be described on the basis of the drawings. The present embodiment presupposes a virtual environment. That is, a description will be given of a method of realizing substantially two types of privilege levels in one privilege level of a CPU allocated to a guest OS (operation system) on a virtual machine which is realized by a program generally called hypervisor. That is, in the case of the CPU having two privilege levels including the privilege mode and the non-privilege mode, the privilege mode is allocated to the hypervisor, and the non-privilege mode is allocated to the guest OS. According to the present embodiment, the two privilege levels are substantially realized in the non-privilege mode allocated to the guest OS, and an access control in accordance with the respective privilege modes is carried out. Among the two privilege levels, an operation mode equivalent to the non-privilege mode in an environment which is not subjected to the virtualization is referred to as "user mode", and an operation mode equivalent to the privilege mode in the environment which is not subjected to the virtualization is referred to "kernel mode". That is, the user mode refers to an operation mode to which an access right set with respect to the non-privilege mode in an entry of the page table is applied. The kernel mode refers to an operation mode to which an access right set with respect to the privilege mode in the entry of the page table is applied.

Also, according to the present embodiment, a second access right having a priority to an access right in units of pages which is an example of a first access right is introduced. The access right in units of pages refers to an access right set in the entry of the page table (also including an entry cached in a TLB (Translation Look-aside Buffer) 151). A single second access right may have a setting range of one or more pages (entries of the page table). The second access right set with respect to the relevant setting range has a priority to the access right (first access right) set in the entry of the page table with respect to the page belonging to the relevant setting range. According to the present embodiment, as means for realizing the above-mentioned second access right, a concept of domains is introduced. The domain has a property in which for each domain, it is possible to set an access right having a priority to the access right set to the page table. Also, the domain has a property in which it is possible to define units (sorting units) for sorting pages related to a virtual address space (sorting the entries of the page table). That is, by the domains, it is possible to divide or sort the pages related to the virtual address space (the entries of the page table) into a plurality of groups or areas (spaces).

It is noted that the property in which it is possible to sort the pages related to the virtual address space by the domains is not requested according to the present embodiment (in particular, a first embodiment and a second embodiment). It may suffice that only one domain is set with respect to all the pages. According to the present embodiment, the access right set with respect to the domain is referred to as "domain access right". That is, the domain access right is an example of the second access right.

The first embodiment will be described. According to the first embodiment, two page tables are generated with respect to one process (virtual access space). In an entry of one of the page tables (hereinafter, which will be referred to as "page table for kernel"), an access right with respect to the kernel mode is set as the access right in the non-privilege mode. In an entry of the other one of the page tables (hereinafter, which will be referred to as "page table for user"), an access right with respect to the user mode is set as the access right in the non-privilege mode. It is noted that in an MMU (Memory Management Unit), an address of one of the page tables is set. This is because the number of the address of the page table that may be set to the regular MMU is limited to one. It is noted that mapping information of both the page tables (correspondence information between a virtual address and a physical address) is the same. Also, the access right of the privilege mode of both the page tables is applied to the hypervisor. Hereinafter, the page table where the address is set in the MMU is referred to as "valid page table" according to the present embodiment. As will be described below, the valid page table may not be immediately switched in accordance with the switch of the operation mode (the user mode, the kernel mode). This is because the switch of the valid page table requests the TLB flush. In other words, by delaying the switch of the valid page table with respect to the switch of the operation mode, the flush of the TLB is delayed. As a result, the number of the occasions for the flush of the TLB is reduced.

A value of the domain access right is decided as illustrated in FIG. 6. FIG. 6 is an explanatory diagram for describing a decision method for a domain access right according to the first embodiment. According to the present embodiment, the access rights that may be set with respect to the domain are sorted into "access permitted", "access not permitted", and "flag". This "access permitted" is an access right with which read and write are permitted. This "access not permitted" is an access right with which any access is forbidden. This "flag" is an access right indicating that the access right set for the entry of the page table is valid (used). It is noted that "access permitted", "access not permitted", and "flag" respectively correspond to "manager", "client", and "no access" in the ARM architecture where the domain may be utilized.

As illustrated in the same drawing, the domain access right is decided in accordance with the valid page table and the operation mode of the guest OS. To be more specific, in a case where the operation mode is the user mode and the valid page table is the page table for the user, the domain access right becomes "flag". In a case where the operation mode is the user mode and the valid page table is the page table for the kernel, the domain access right becomes "access not permitted". In a case where the operation mode is the kernel mode and the valid page table is the page table for the user, the domain access right becomes "flag". In a case where the operation mode is the kernel mode and the valid page table is the page table for the kernel, the domain access right becomes "flag".

It is noted that in a case where a plurality of domains are allocated to one virtual address space, as the value of the domain access right, a value common to all the domains is applied. In view of the above-mentioned point, therefore, according to the first embodiment, the property in which it is possible to carry out the grouping of the pages by the domains is not requested. It is noted that it is set that no duplication between the domains exists. That is, it is not permitted that one page belongs to a plurality of domains.

According to the first embodiment, at the time of the operation mode switch, for example, a processing illustrated in FIG. 7 is executed.

FIG. 7 is an explanatory diagram for describing an example of a processing content at the time of an operation mode switch according to the first embodiment. The same drawing illustrates a processing content that is to be executed in a case when the operation mode of the guest OS on a single VM 12 is switched. The operation mode before the switch is assumed as the user mode. Also, the valid page table before the switch of the operation mode is assumed as the page table for the user. That is, in an MMU 105, the address of the page table for the user is registered.

When the switch from the user mode to the kernel mode is detected (S11), the hypervisor 11 sets "flag" as the domain access setting in the MMU 105 (S12). It is however noted that in accordance with the switch to the kernel mode, the page table for the kernel is not immediately set as the valid page table (S13). That is, the valid page table is still the page table for the user. Therefore, the execution of the flush of the TLB 151 is not carried out.

It is noted that also in a case where the operation mode is the kernel mode and the valid page table is the page table for the kernel, the processing procedure is similar. That is, the domain access right is set as "access not permitted" but the valid page table is not changed. The flush of the TLB 151 is not also executed.

In this manner, according to the first embodiment, an inconsistency (deviation) may occur between the operation mode and the valid page table in accordance with the switch of the operation mode of the guest OS. To be more specific, a state in which the page table for the kernel is valid at the time of the user mode or a state in which the page table for the user is valid at the time of the kernel mode may be generated. An access protection on the memory in the above-mentioned state in which the inconsistency occurs is secured by the domain access right. That is, in a state in which the page table for the kernel is valid at the time of the user mode, as the domain access right is "access not permitted", a memory access beyond the original authority of the user mode is denied. Also, in a state in which the page table for the user is valid at the time of the kernel mode, the domain access is "flag". That is, whether the memory access is permitted or not is determined on the basis of the access right with respect to the user mode. The access right of the user mode is smaller than the access right of the kernel mode. Therefore, in this case too, a memory access beyond the original authority of the kernel mode is denied.

To elaborate, in a state in which the inconsistency occurs between the operation mode and the valid page table, the domain access right is set so that the original authority of the operation mode is restricted (an access right smaller than the original access right is permitted). In other words, in a case where the switch of the operation mode occurs, the domain access is set to be smaller than or equal to the access right of the operation mode having the relatively smaller access right among the two operation modes. As a result, the permission on the memory access beyond the original access right is prevented. It is noted that the original access right refers to an access right set to the entry of the page table corresponding to the operation mode.

However, in this case, a probability exists that even a memory access that is permitted in the original access right of the operation mode may be denied. That is, despite the memory access that is originally permitted, a fault (access violation) is generated.

For example, FIG. 8A and FIG. 8B are explanatory diagrams for describing a case in which a fault is generated with respect to the memory access that is permitted.

In the same drawing, FIG. 8A illustrates six ways of setting examples with regard to the access rights of the entry of the page table for each of the user mode and the kernel mode.

FIG. 8B illustrates access rights applied to each of the operation modes in accordance with whether the valid page table is the page table for the user or the page table for the kernel. It is noted that a correspondence relation between the access right of the page table in FIG. 8A and the access right to be applied in FIG. 8B is secured through the matching of the column.

In FIG. 8B, in a case where the page table for the user is valid, the access right to be applied when the operation mode is the kernel mode is a value set in the access right of the page table of the user mode in FIG. 8A. As described in FIG. 6, this is because the domain access right in this case becomes "flag". Accordingly, in this case, when the access rights surrounded by the bold lines (the second column and the third column) are applied, although the memory access is within the authority of the kernel mode, the fault of the violation with respect to the domain access right is generated. To be more specific, in FIG. 8A, the access right of the second column of the kernel mode is "rw (read write permitted)", and the access right of the third column is "rw". On the other hand, in FIG. 8B, the access right of the second column of the kernel mode in a case where the page table for the user is valid is "ro (read permitted)", and the access right of the third column is "no (access forbidden)". That is, in the page table, although the access right "rw" is given, in actuality, the access right "ro" or "no" is applied.

Also, in FIG. 8B, in a case where the page table for the kernel is valid, the access rights applied when the operation mode is the user mode are "no" in all the cases. As described in FIG. 6, this is because the domain access right in this case becomes "access not permitted". Accordingly, in this case, when the access rights surrounded by the bold lines (the first column, the second column, and the fourth column) are applied, although the memory access is within the authority of the user mode, the fault of the violation with respect to the domain access right is generated. To be more specific, in FIG. 8A, the access right of the first column of the user mode is "rw", and the access rights of the second column and the fourth column are "ro (read permitted)". On the other hand, in FIG. 8B, the access rights of the first column, the second column, and the fourth column of the user mode in a case where the page table for the kernel is valid are "no". That is, in the page table, although the access right "rw" or "ro" is given, in actuality, the access right "no" is applied.

Figure 9:
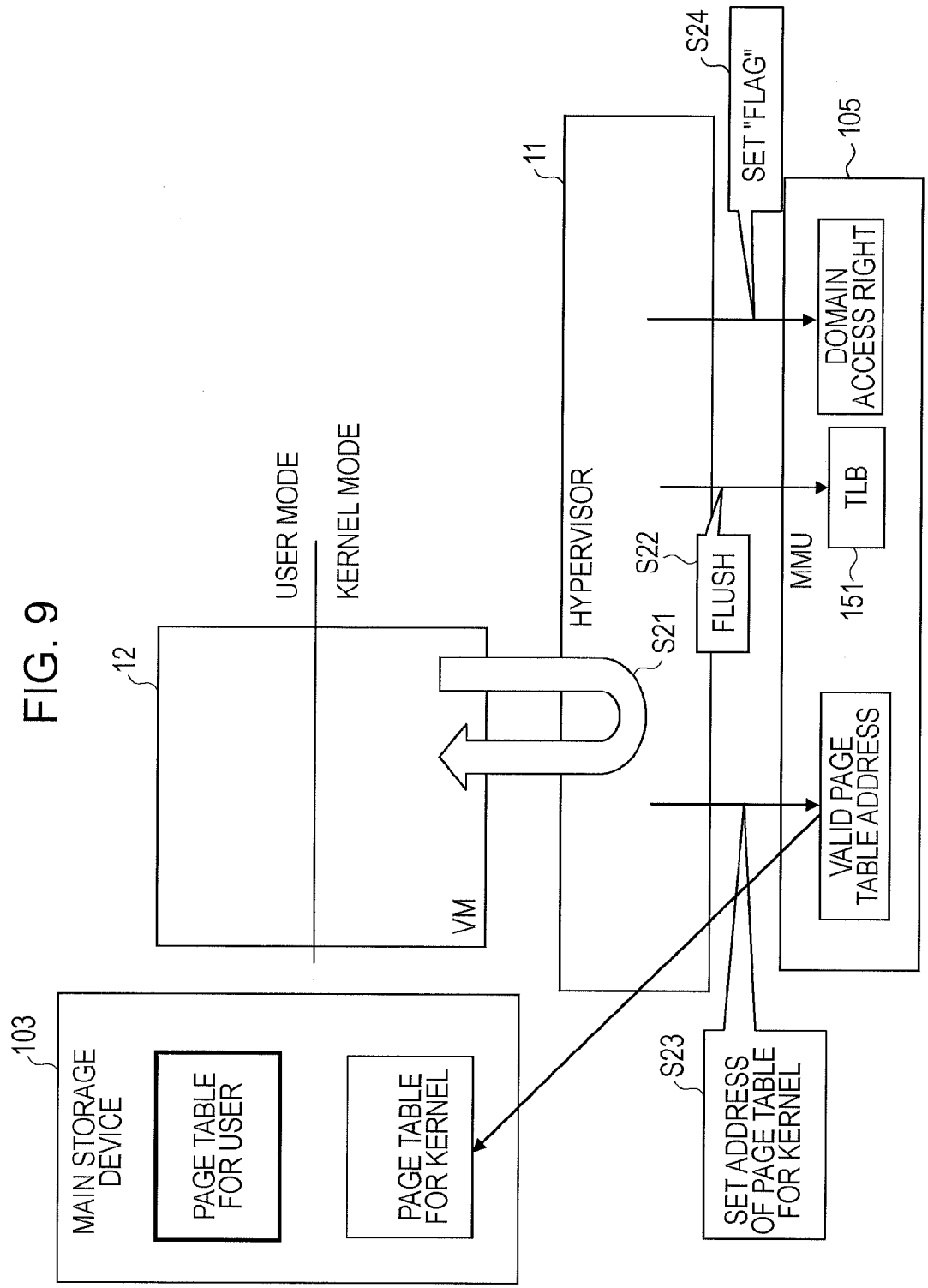
FIG. 9 is an explanatory diagram for describing an example of a processing content at the time of the fault generation according to the first embodiment.

In view of the above, according to the present embodiment, a processing illustrated in FIG. 9 is executed at the time of the fault generation.

FIG. 9 is an explanatory diagram for describing an example of a processing content at the time of the fault generation according to the first embodiment. An initial state in the same drawing is a state after the switch of the operation mode in FIG. 7. That is, the operation mode is the kernel mode. Also, the valid page table is the page table for the user.

In this state, when the fault is detected (S21), the hypervisor 11 flushes the TLB 151 (S22). Subsequently, the hypervisor 11 sets the address of the page table for the kernel in the MMU 105 (S23). That is, the page table for the kernel is exclusively enabled. Subsequently, the hypervisor 11 sets "flag" as the domain access setting in the MMU 105 (S24) (see FIG. 6). That is, the domain access right is updated not only at the time of the switch of the operation mode but also at the time of the fault generation. At the time of the fault generation, through the above-mentioned processing, as the inconsistency between the operation mode of the guest OS and the valid page table is corrected, the domain access right is set as "flag" so as to be matched with the access right of the entry of the valid page table.

After that, the hypervisor 11 shifts the control onto the guest OS.

Through the above-mentioned scheme, the number of the occasions for the flush of the TLB 151 may be limited to requested times. Also, even in a case where the operation mode and the valid page table are not consistent with each other, it is possible to appropriately realize the access protection through the access control utilizing the domain access right.

Subsequently, with regard to the content described above, an application example to a specific information processing apparatus will be described.

Figure 10:
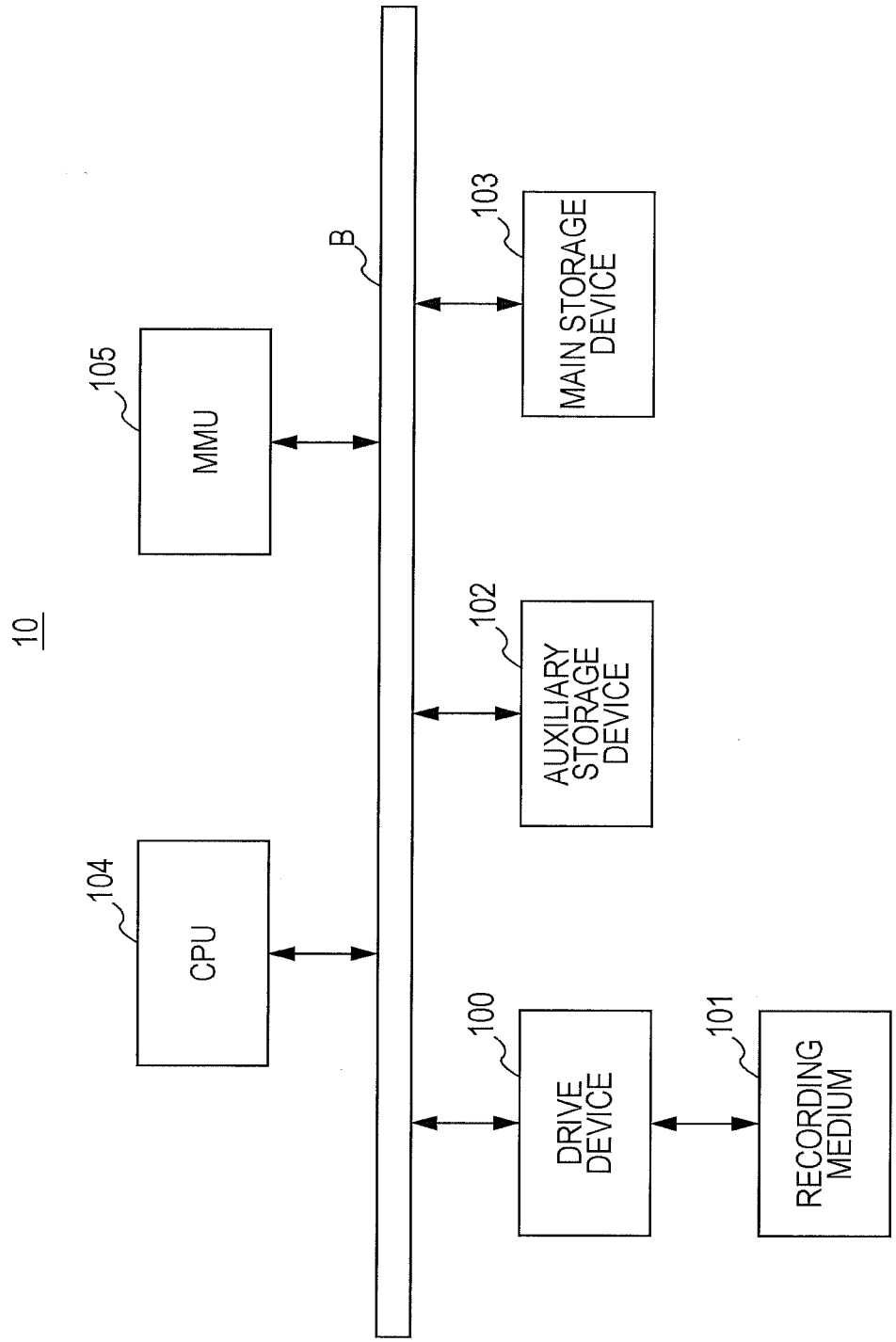
FIG. 10 illustrates a hardware configuration example of an information processing apparatus according to the first embodiment.

FIG. 10 illustrates a hardware configuration example of an information processing apparatus according to the first embodiment. In the same drawing, an information processing apparatus 10 has a drive device 100, an auxiliary storage device 102, a main storage device 103, a CPU 104, and the MMU 105 which are mutually connected via a bus B respectively.

A program for realizing the processing in the information processing apparatus 10 is provided through a recording medium 101 such as a CD-ROM. When the recording medium 101 on which the program is recorded is set in the drive device 100, the program is installed from the recording medium 101 via the drive device 100 into the auxiliary storage device 102. It is noted that the installment of the program does not necessarily need be performed by the recording medium 101, and the program may be downloaded from another computer via a network. The auxiliary storage device 102 stores the installed program and also stores requested files, data, and the like.

In a case where an activation instruction of the program is issued, the main storage device 103 reads out the program from the auxiliary storage device 102 to be stored. While following the program stored in the main storage device 103, the CPU 104 executes a function related to the information processing apparatus 10. The MMU 105 is an example of memory management means and is a so-called memory management unit (the MMU 105). That is, with regard to the memory access requested by the CPU 104, the MMU 105 executes the translation from the virtual address to the physical address, the access control (memory protection control), and the like.

It is noted that the CPU 104 does not need to have a special system for supporting the virtualization. Also, the information processing apparatus 10 is not limited to a general-use computer. Embedded devices such as a mobile phone and various electronic devices may be applied to the present embodiment as the information processing apparatus 10.

Figure 11:
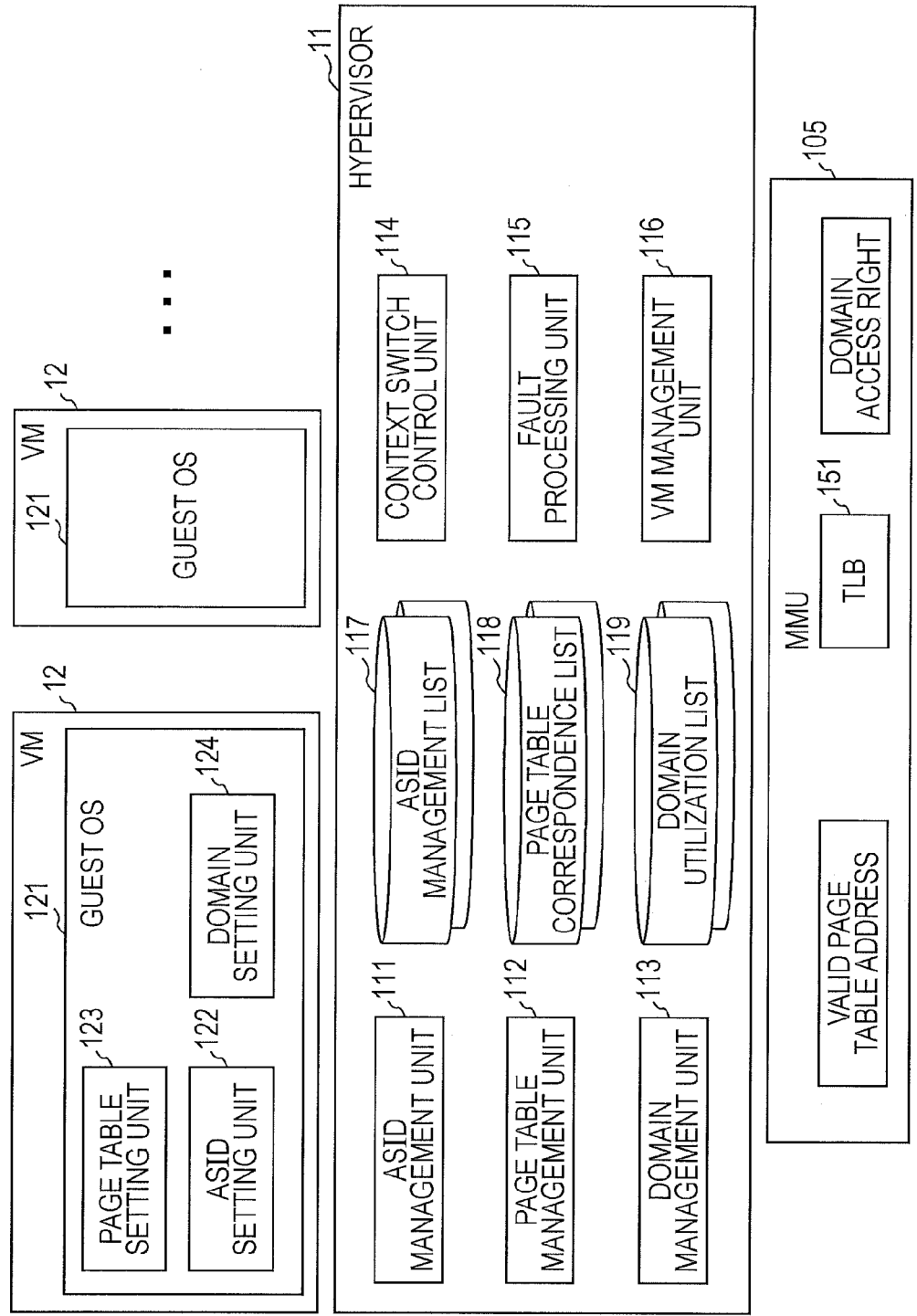
FIG. 11 illustrates a software configuration example of the information processing apparatus according to the first embodiment.

FIG. 11 illustrates a software configuration example of the information processing apparatus according to the first embodiment. The information processing apparatus 10 has a hypervisor 11.

The hypervisor 11 is a control program for the virtualization of the information processing apparatus 10, and that is, through the processing which the hypervisor 11 causes the CPU 104 to execute, one or more VMs 12 operate in the information processing apparatus 10. The hypervisor 11 is also referred to as a Virtual Machine Monitor (VMM). It is noted that according to the present embodiment, the hypervisor 11 is an example of a memory access control program.

The VM 12 is a so-called a Virtual Machine and emulates the information processing apparatus 10 with respect to the guest OS 121. On the respective VMs 12, the guest OS 121 (Operating System) may operate. On the respective guest OSs 121, processes of various types of software operate. It is noted that the guest OS refers to an OS operating on the VM.

In general, for a virtualization technology for realizing the virtual machine, two types exist. One is a full-virtualization (which is also referred to as HVM (Hardware Virtual Machine)) in which the OS may operate as it is without modifications. The other one is a para-virtualization (which is also referred to as PV (Para Virtualization)) in which the OS operates while a privilege instruction is corrected into a call to the hypervisor (which is called hypercall). According to the present embodiment, either virtualization technology may be adopted.

In the case of the full-virtualization, the hypervisor 11 is notified of the privilege instruction executed on the virtual machine through an exception generated by the CPU 104. In the case of the para-virtualization, the hypervisor 11 is notified of the privilege instruction through the hypercall. The hypercall is realized by utilizing a function of the CPU 104 such as a software interruption. In the case of the full-virtualization too, the notification through the hypercall may be carried out. According to the present embodiment too, by utilizing the notification system such as the above-mentioned hypercall or the exception, the instruction from the VM 12 to the hypervisor 11 is carried out.

In FIG. 11, the kernel of the guest OS 121 operating on the respective VMs 12 has an ASID setting unit 122, a page table setting unit 123, a domain setting unit 124, and the like.

The ASID setting unit 122 is an example of identifier setting means. The ASID setting unit 122 notifies the hypervisor 11 of the ASID (Address Space Identifier)) allocated for each of the processes that are managed by the guest OS 121. The ASID refers to an identifier to the virtual address space of the respective processes. To avoid the duplication of the ASIDs allocated in the respective guest OSs 121, the ASIDs used in the guest OS 121 may be virtualized. To be more specific, in the guest OS 121, all the ASIDs may be used, and the hypervisor 11 translates the virtual ASID recognized by the guest OS 121 into the actual ASID.

The page table setting unit 123 notifies the hypervisor 11 of an address of the page table related to the virtual address space managed by the guest OS 121. With respect to one virtual address space (process), two page tables including a page table for the user mode (the page table for the user) and a page table for the kernel mode (the page table for the kernel) are generated, and the hypervisor 11 is notified of respective addresses.

The domain setting unit 124 notifies the hypervisor 11 of an identifier of the domain used by the guest OS 121 (hereinafter, which will be referred to as "domain number"). It is noted that the domain numbers used by the respective guest OSs 121 are previously decided so as to avoid duplications between the guest OSs 121. For example, as setting information of the guest OS 121, the domain numbers are set in the respective guest OSs 121. Alternatively, like the ASID, to avoid the duplications of the domain numbers between the guest OSs, the domain numbers used in the guest OSs 121 may be virtualized. In either case, the actual domain numbers (domain numbers recorded in the page tables) are suitably configured to avoid the duplications between the guest OS 121. In a case where the duplications are involved, the TLB flush needs to be carried out in the hypervisor at the time of the switch of the guest OS 121.

The hypervisor 11 has an ASID management unit 111, a page table management unit 112, a domain management unit 113, a context switch control unit 114, a fault processing unit 115, a VM management unit 116, an ASID management list 117, a page table correspondence list 118, a domain utilization list 119, and the like.

The ASID management unit 111 is an example of identifier management means. In accordance with an instruction from the ASID setting unit 122 of the guest OS 121, the ASID management unit 111 performs an update of the ASID management list 117 corresponding to the VM 12 where the relevant guest OS 121 operates. The ASID management unit 111 also performs the deletion of the ASID management list 117 corresponding to the relevant VM 12 at the end of the VM 12.

The ASID management list 117 is an example of identifier storage means. The ASID management list 117 is generated, for example, in the main storage device 103 for each VM 12 (for each guest OS 121). The ASID management list 117 stores a list of the ASIDs allocated to the guest OS 121 operating on the corresponding VM 12. In general, the guest OS 121 allocates the ASID for each process. Therefore, the number of entries of the ASID management list 117 is matched with the number of processes on the corresponding VM 12.

In accordance with an instruction from the page table setting unit 123 of the guest OS 121, the page table management unit 112 performs an update of the page table correspondence list 118 corresponding to the VM 12 where the relevant guest OS 121 operates. The page table management unit 112 also performs the deletion of the page table correspondence list 118 corresponding to the relevant VM 12 at the end of the VM 12.

The page table correspondence list 118 is an example of page table correspondence information storage means. The page table correspondence list 118 is generated, for example, in the main storage device 103 for each VM 12 (for each guest OS 121). The page table correspondence list 118 stores the address of the page table for the user and the address of the page table for the kernel and the address of the currently used (currently valid) page table while being associated with each other. In general, the guest OS 121 allocates the page table for each process. Therefore, the number of entries of the page table correspondence list 118 is matched with the number of processes on the corresponding VM 12.

In accordance with an instruction from the domain setting unit 124 of the guest OS 121, the domain management unit 113 performs an update of the domain utilization list 119 corresponding to the VM 12 where the relevant guest OS 121 operates. The domain management unit 113 also performs a deletion of the domain utilization list 119 corresponding to the relevant VM 12 at the end of the VM 12.

The domain utilization list 119 is generated, for example, in the main storage device 103 for each VM 12 (for each guest OS 121). The domain utilization list 119 stores the domain number of the domain used by the VM 12 (the guest OS 121).

The context switch control unit 114 performs the switch between the user mode and the kernel mode of the guest OS 121. For the context switch of the hypervisor 11, the switch between the VMs 12 and the switch between the processes in the guest OS 121 are also included, but according to the present embodiment, a description will be given while targeting the switch between the user mode and the kernel mode.

The fault processing unit 115 processes the exception generated by the CPU 104. It is noted that according to the present embodiment, the exception that becomes the processing target by the fault processing unit 115 is limited to a fault generated in a case where the domain access right is violated (hereinafter, which will be referred to as "domain fault") and an access violation generated when the access right set for the entry of the page table is violated.

The VM management unit 116 executes a fundamental function of the hypervisor. That is, the VM management unit 116 performs a processing control for realizing the VM 12. For example, the VM management unit 116 executes an activation (generation), end, switch of the VM 12, and the like. The switch of the VM 12 refers to a switch of the VM 12 that uses the CPU 104 when a plurality of VMs 12 are activated. For example, the switch of the VM 12 refers to a processing of assigning the CPU 104 to another VM 12 when a certain period of time elapses. Therefore, the VM management unit 116 regularly grasps which VM 12 operates (that uses the CPU 104). Information that the VM management unit 116 grasps is recoded as VM management information, for example, in the main storage device 103.

It is noted that as illustrated in FIG. 11, according to the first embodiment, the MMU 105 is cache means for caching the entry of the page table utilized for the address translation or the like at the time of the memory access by using the TLB 151. Also, for the MMU 105, the setting of the valid page address and the domain access right may be carried out. The MMU 105 performs the control on the memory access while the domain access right is caused to have a priority to the access right of the entry of the page table related to the valid page address (applied by priority).

Figure 12:
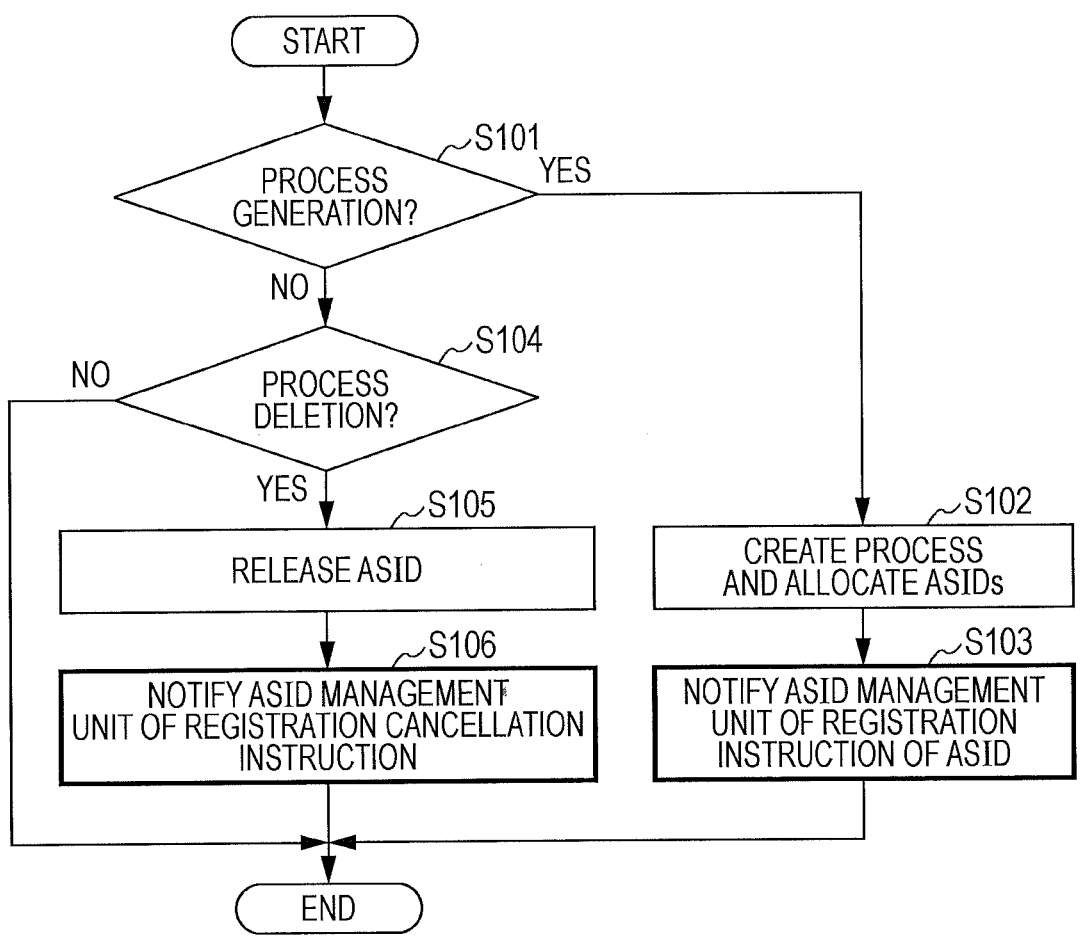
FIG. 12 is a flow chart for describing a processing procedure executed by an ASID setting unit according to the first embodiment.

Hereinafter, a processing procedure of the information processing apparatus 10 will be described. FIG. 12 is a flow chart for describing a processing procedure executed by an ASID setting unit according to the first embodiment.

The ASID setting unit 122 notifies the ASID management unit 111 of the hypervisor 11 of the instruction in conjunction with a process management processing executed by the guest OS 121. The process management processing includes a process generation, a process deletion, a process switch, and the like.

When a process is generated in the guest OS 121 (S101: YES), the ASID setting unit 122 of the relevant guest OS 121 allocates one ASID to the relevant process (that is, the virtual address space related to the relevant process) (S102). Subsequently, the ASID setting unit 122 notifies the ASID management unit 111 of the registration instruction of the ASID allocated (S103). It is noted that in the guest OS 121 too, the correspondence relation between the process and the ASID is managed.

On the other hand, when the process is deleted in the guest OS 121 (S104: YES), the ASID setting unit 122 of the relevant guest OS 121 releases the ASID corresponding to the relevant process (S105). Subsequently, the ASID setting unit 122 specifies the relevant ASID and notifies the ASID management unit 111 of a registration cancellation instruction of the relevant ASID (S106).

It is noted that at the time of the switch of the process too, an instruction is issued from the guest OS 121 to the hypervisor 11 so that the process currently executed in the guest OS 121 is switched, but according to the present embodiment, the ASID setting unit 122 does not deal with the switch of the process.

Subsequently, a processing procedure executed by the ASID management unit 111 in accordance with an instruction from the ASID setting unit 122 will be described.

Figure 13:
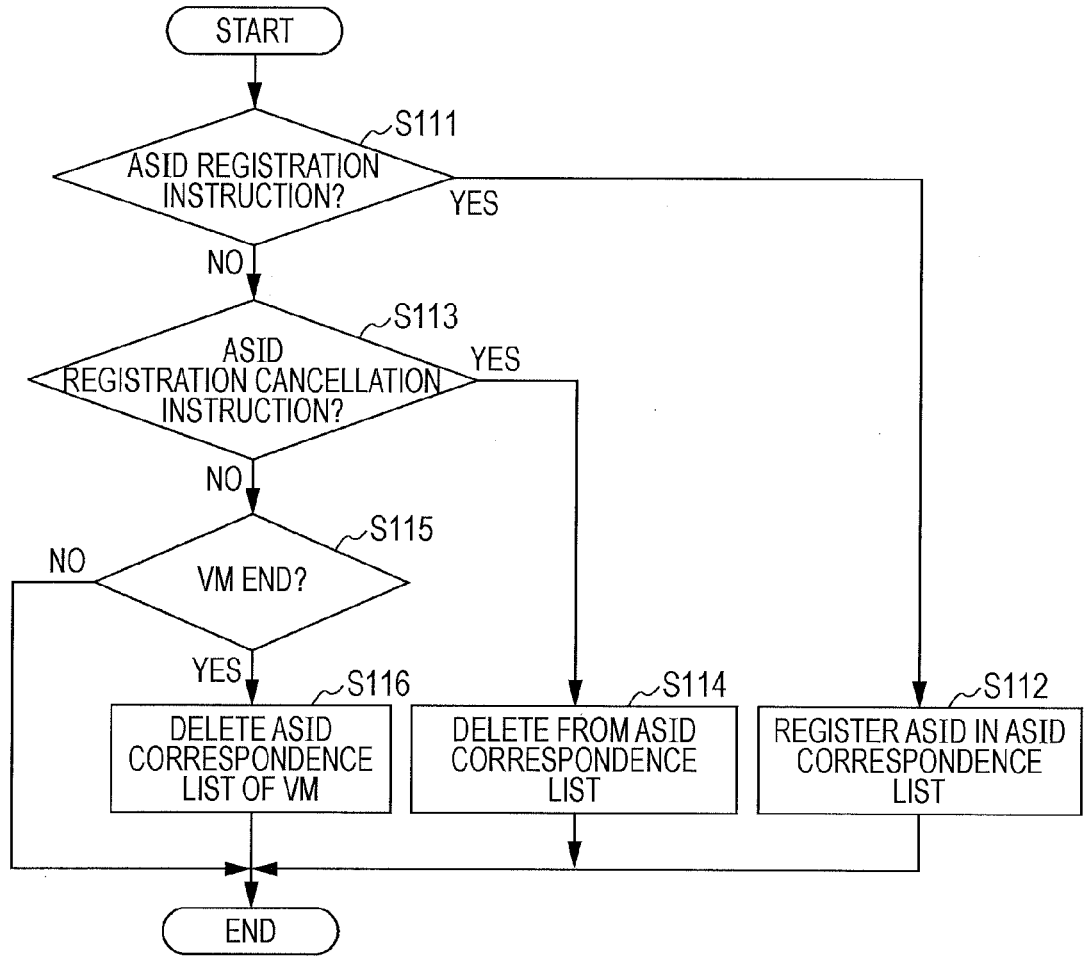
FIG. 13 is a flow chart for describing a processing procedure executed by an ASID management unit according to the first embodiment.

FIG. 13 is a flow chart for describing a processing procedure executed by an ASID management unit according to the first embodiment.

A registration instruction of the ASID is notified from the ASID setting unit 122 (S111: YES), the ASID management unit 111 adds the entry including the ASID specified by the registration instruction to the ASID management list 117 corresponding to the VM 12 where the relevant ASID setting unit 122 operates (S112). It is noted that in a case where the relevant ASID management list 117 does not exist, the ASID setting unit 122 generates the ASID management list 117 corresponding to the relevant VM 12, for example, in the main storage device 103.

Figure 14:
FIG. 14 illustrates a configuration example of an entry of an ASID management list according to the first embodiment.

FIG. 14 illustrates a configuration example of an entry of an ASID management list according to the first embodiment. As illustrated in the same drawing, one entry of the ASID management list 117 has items for storing a VMID and the ASID. The VMID is an identifier of the VM 12 related to the registration instruction source of the entry. The hypervisor 11 may discriminate the VM 12 where the guest OS 121 of the respective instruction sources operates.

It is noted that according to the present embodiment, as the ASID management list 117 is generated for each VM 12, the item for the VMID is not necessarily needed. In a case where one ASID management list 117 is commonly used with respect to the plurality of VMs, the item for the VMID is needed.

Also, the ASID is information corresponding to each process, but an item for the process ID does not necessarily need to be provided to the ASID management list 117. When the guest OS 121 switches the process, the hypervisor 11 is notified of the ASID related to the switch destination. Therefore, the hypervisor may identify the entry corresponding to the currently executed process by searching for the notified ASID from the ASID management list 117. It is however noted that the item for the process ID may be provided.

On the other hand, when the registration cancellation instruction of the ASID is notified from the ASID setting unit 122 (S113: YES), the ASID management unit 111 deletes the entry including the ASID specified in the registration cancellation instruction from the ASID management list 117 corresponding to the VM 12 where the ASID setting unit 122 of the relevant registration cancellation instruction source operates (S114).

Also, when the end of the VM 12 is notified from the VM management unit 116 (S115: YES), the ASID management unit 111 deletes the ASID management list 117 corresponding to the ended VM 12 (S116).

Figure 15:
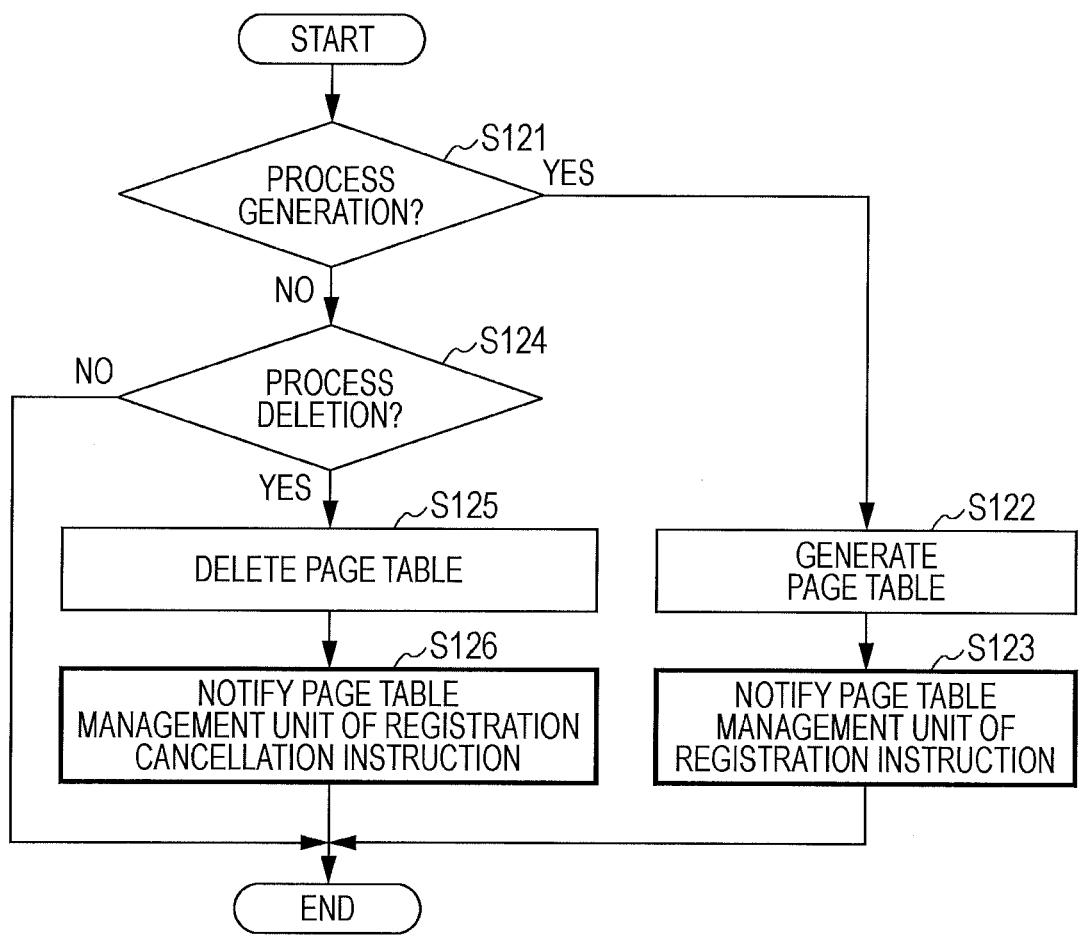
FIG. 15 is a flow chart for describing a processing procedure executed by a page table setting unit according to the first embodiment.

Subsequently, FIG. 15 is a flow chart for describing a processing procedure executed by a page table setting unit according to the first embodiment.

When a process is generated in the guest OS 121 (S121: YES), the page table setting unit 123 of the relevant guest OS 121 generates two page tables corresponding to the relevant process (that is, the virtual address space related to the relevant process) (S122). One is the page table for the user, and the other one is the page table for the kernel. The respective page tables are generated, for example, in the main storage device 103.

Subsequently, the page table setting unit 123 notifies the page table management unit 112 of the registration instruction of the addresses of the two page tables (S123).

On the other hand, when the process is deleted in the guest OS 121 (S124: YES), the page table setting unit 123 deletes the two page tables corresponding to the relevant process (S125). Subsequently, the page table setting unit 123 specifies the address of at least one of the deleted two page tables and notifies the page table management unit 112 of the registration cancellation instruction of the relevant address (S126).

It is noted that an anteroposterior relation of the processing procedure between the ASID setting unit 122 and the page table setting unit 123 at the time of the process generation or the process deletion is not limited to a predetermined configuration.

Subsequently, a processing procedure executed by the page table management unit 112 in accordance with an instruction from the page table setting unit 123 will be described.

FIG. 16 is a flow chart for describing a processing procedure executed by a page table management unit according to the first embodiment.

When the registration instruction of the addresses of the page tables is notified from the page table setting unit 123 (S131: YES), the page table management unit 112 adds the entry including a set of the addresses of the two page tables specified in the registration instruction to the page table correspondence list 118 corresponding to the VM 12 where the page table setting unit 123 that is the relevant registration instruction source operates (S132). It is noted that in a case where the relevant page table correspondence list 118 does not exist, the page table setting unit 123 generates the page table correspondence list 118 corresponding to the relevant VM 12, for example, in the main storage device 103.

FIG. 17 illustrates a configuration example of an entry of a page table correspondence list according to the first embodiment. As illustrated in the same drawing, one entry of the page table correspondence list 118 has items for storing the VMID, the page table address for the user, the page table address for the kernel, a current page table address, and the like.

The VMID is an identifier of the VM 12 related to the registration instruction source of the entry. Like the ASID management list 117, as the page table correspondence list 118 is generated for each VM 12, the item for the VMID is not necessarily needed. The page table address for the user and the page table address for the kernel are respective addresses of the two page tables included in the registration instruction. The current page table address is the address of the valid page table. The valid page table refers to a page table whose address is set in the MMU 105 and which is used by the MMU 105. In a stage of step S132, the valid page table is not decided yet (none of the page tables is used), and therefore nothing is registered in the current page table address.

It is noted that as described in FIG. 7, FIG. 9, and the like, an inconsistency may occur between the valid page table and the operation mode of the guest OS 121 in some cases. Therefore, the page table related to the current page address is not necessarily coherent to the operation mode.

Also, the page table address for the user, the page table address for the kernel, and the like are the information corresponding to each process, but an item for the process ID does not necessarily need to be provided to the page table correspondence list 118. When the guest OS 121 switches the process, the hypervisor 11 is notified of the address of the page table related to the switch destination. Therefore, the hypervisor 11 may identify the entry of the page table corresponding to the currently executed process by searching for the page table address for the user or the page table address for the kernel matched with the notified address from the page table correspondence list 118. It is however noted that the item for the process ID may be provided.

On the other hand, when the registration cancellation instruction of the address of the page table is notified from the page table setting unit 123 (S133: YES), the page table management unit 112 deletes the entry including the address of the page table specified in the registration cancellation instruction from the page table correspondence list 118 corresponding to the VM 12 where the page table setting unit 123 of the relevant registration cancellation instruction source operates (S134).

Also, when the end of the VM 12 is notified from the VM management unit 116 (S135: YES), the page table management unit 112 deletes the page table correspondence list 118 corresponding to the ended VM 12 (S136).

Figure 18:
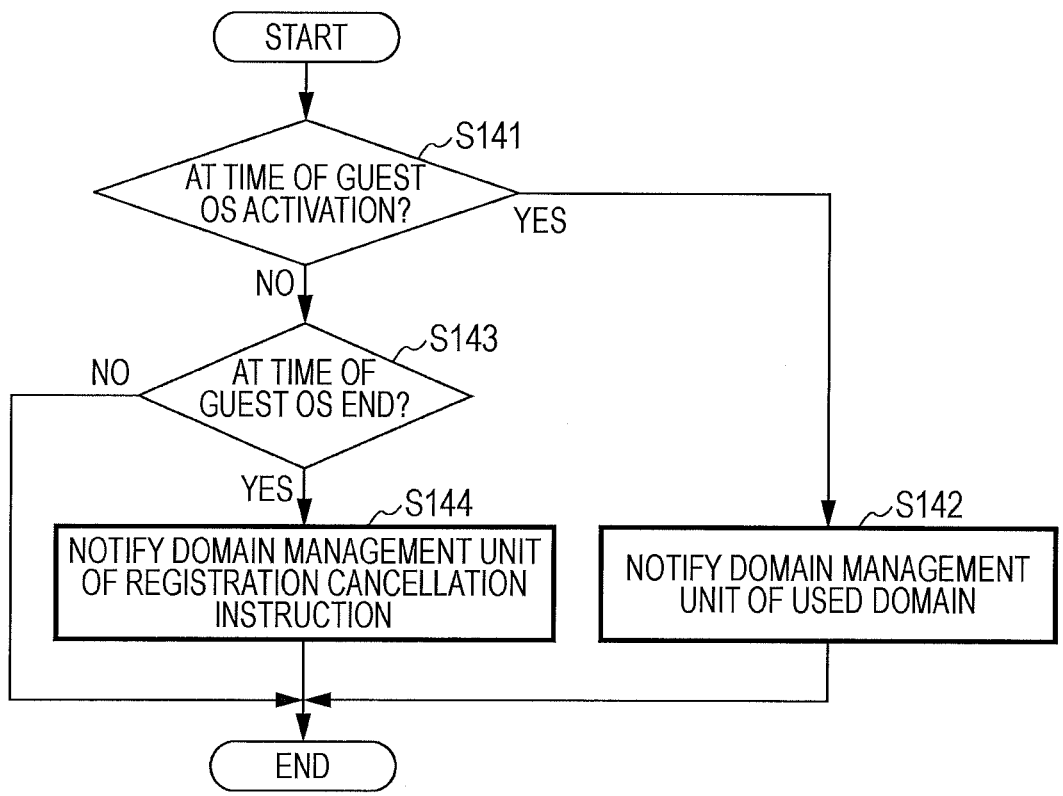
FIG. 18 is a flow chart for describing a processing procedure executed by a domain setting unit according to the first embodiment.

Subsequently, FIG. 18 is a flow chart for describing a processing procedure executed by a domain setting unit according to the first embodiment.

At the time of the activation of the guest OS 121 (S141: YES), the domain setting unit 124 of the relevant guest OS 121 notifies the domain management unit 113 of the domain numbers of the domains used by the relevant guest OS 121 (S142).

At the end of the guest OS 121 (S143: YES), the domain setting unit 124 of the relevant guest OS 121 notifies the domain management unit 113 of the registration cancellation instruction of the domain number (S144).

It is noted that to which domains the respective pages belong are decided at the time of the page table generation and set as the domain numbers in the entry of the page table. That is, to which domains the respective virtual space addresses belong are previously decided or set for each guest OS 121.

Subsequently, a processing procedure executed by the domain management unit 113 in accordance with an instruction from the domain setting unit 124 will be described.

Figure 19:
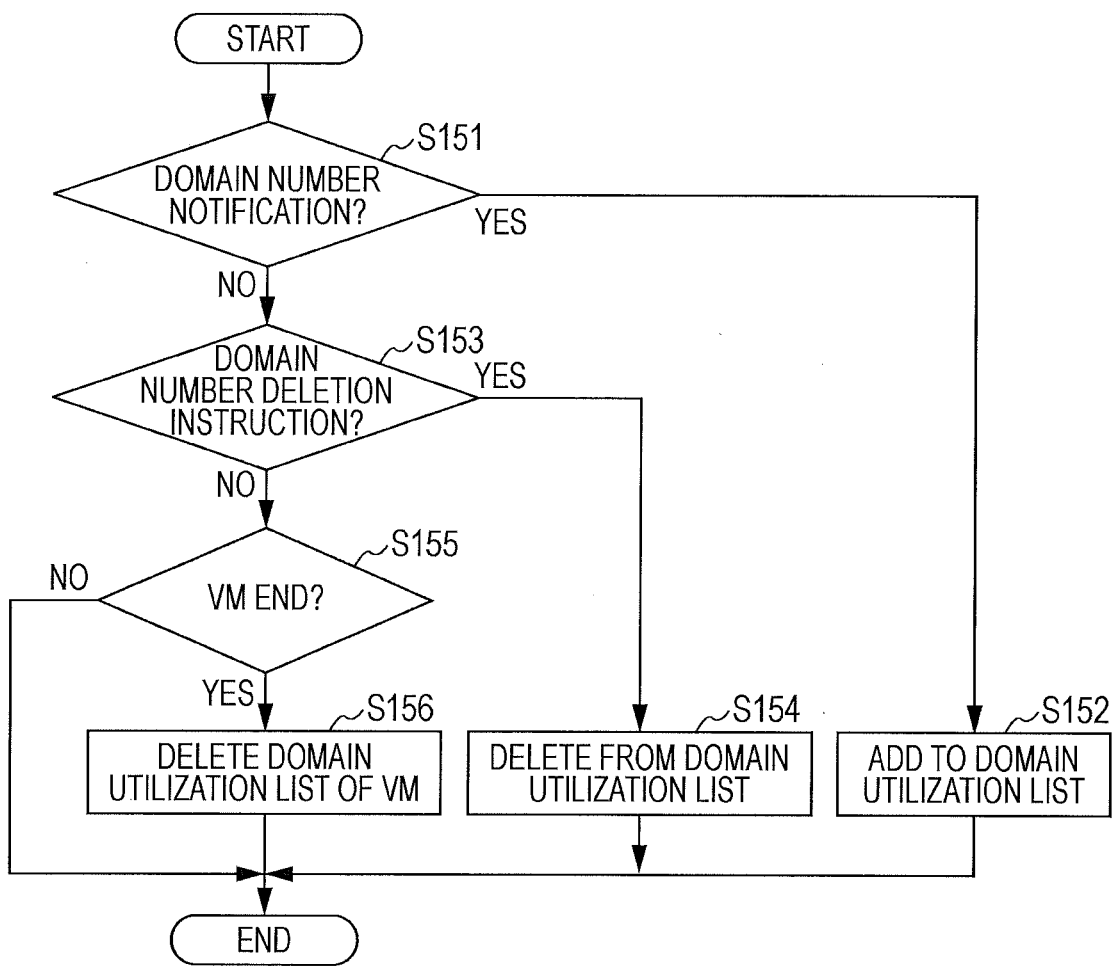
FIG. 19 is a flow chart for describing a processing procedure executed by a domain management unit according to the first embodiment.

FIG. 19 is a flow chart for describing a processing procedure executed by a domain management unit according to the first embodiment.

When the registration instruction of the domain number is notified from the domain setting unit 124 (S151: YES), the domain management unit 113 adds the entry including the domain number specified in the registration instruction in the domain utilization list 119 corresponding to the VM 12 where the relevant domain setting unit 124 operates (S152). It is noted that in a case where the relevant domain utilization list 119 does not exist, the domain setting unit 124 generates the domain utilization list 119 corresponding to the relevant VM 12, for example, in the main storage device 103.

Figure 20:
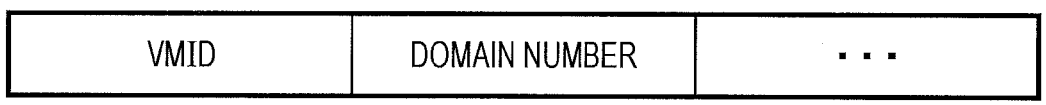
FIG. 20 illustrates a configuration example of an entry of a domain utilization list according to the first embodiment.

FIG. 20 illustrates a configuration example of an entry of a domain utilization list according to the first embodiment. As illustrated in the same drawing, one entry of the domain utilization list 119 has items for storing the VMID and one or more domain numbers. The VMID is an identifier of the VM 12 related to the registration instruction source of the entry. The domain number is a notified domain number. In a case where a plurality of domain numbers are notified, the plurality of domain numbers are registered with respect to one entry.

On the other hand, when the registration cancellation instruction of the domain number is notified from the domain setting unit 124 (S153: YES), the domain management unit 113 deletes the entry corresponding to the VM 12 where the domain setting unit 124 of the registration cancellation instruction source operates from the domain utilization list 119 (S154).

Also, when the end of the VM 12 is notified from the VM management unit 116 (5155: YES), the domain management unit 113 deletes the domain utilization list 119 corresponding to the ended VM 12 (S156).

It is noted that according to the present embodiment, an example is illustrated in which the guest OS 121 (the domain setting unit 124) notifies the hypervisor 11 of the addition or deletion of the domain number. However, the hypervisor 11 (the domain management unit 113) may automatically or actively identify the domain number used by the guest OS 121. To be more specific, the hypervisor 11 obtains the domain number from the entry of the page table. The hypervisor 11 registers the relevant domain number in the domain utilization list 119.

Figure 21:
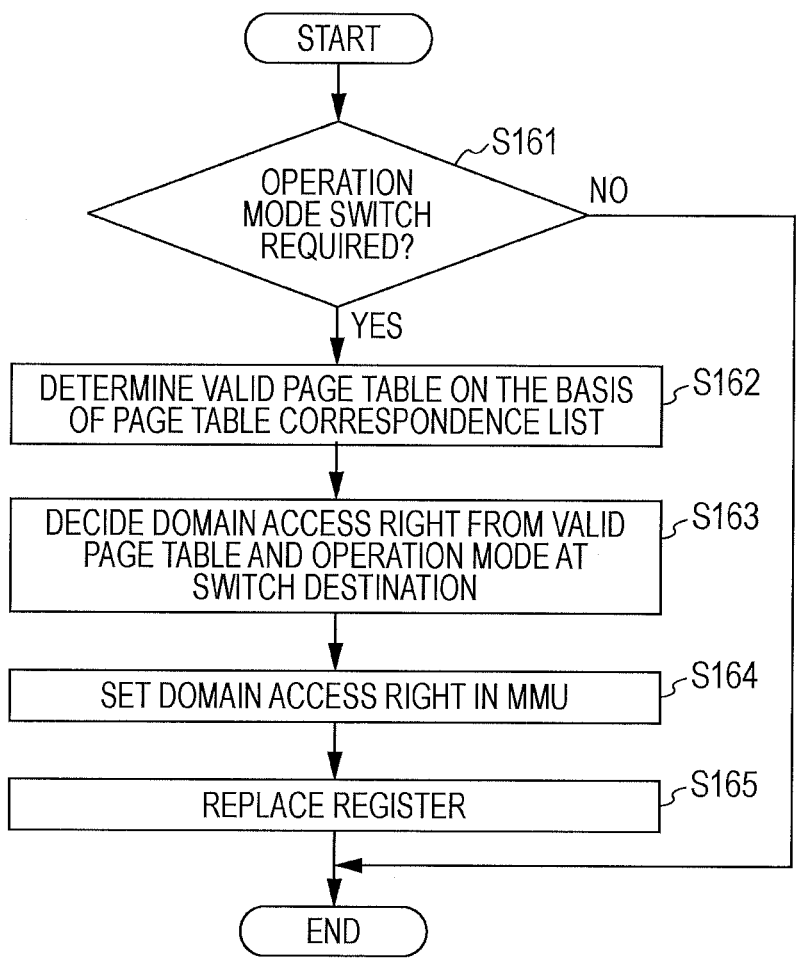
FIG. 21 is a flow chart for describing a processing procedure executed by a context switch control unit according to the first embodiment.

Subsequently, FIG. 21 is a flow chart for describing a processing procedure executed by a context switch control unit according to the first embodiment. The flow chart in the same drawing corresponds to the processing content described in FIG. 7.

Herein, the switch of the operation mode of the guest OS 121 will be described. In the case of the OS operating in the environment that is not subjected to the virtualization, the OS grasps all the switch of the user mode and the kernel mode. The switch from the kernel mode to the user mode is realized by carrying out the reconstruction of the context in the user mode. At this time, the operation mode of the CPU is also transited from the privilege mode to the non-privilege mode. The transition from the user mode to the kernel mode is forcedly executed by the CPU when an interruption, an exception, or the like is generated. At this time, the operation mode of the CPU becomes the privilege mode. The OS saves the context at the time of the user mode before the transition so that the transition to the user mode may be carried out again. As the kernel mode is executed from a predetermined entry point in an asynchronous manner by the interruption, the exception, or the like, no context exists.

On the other hand, with regard to the guest OS 121 operating the virtualization environment (on the virtual machine), the hypervisor 11 grasps all the switch of the user mode and the kernel mode. As the switch from the kernel mode to the user mode is carried out explicitly by the guest OS 121, at the time of the switch, an instruction of the switch to the user mode from the guest OS 121 to the hypervisor 11 is issued. As the transition from the user mode to the kernel mode may not be carried out explicitly by the guest OS 121 and the transition is forcedly carried out by the CPU, the control is transited to the hypervisor 11 at the time of the generation of the interruption, the exception, or the like. The hypervisor 11 (the VM management unit 116) investigates a type of the interruption or the exception, and in a case where the guest OS 121 is notified, the hypervisor 11 decides that the guest OS 121 is transited to the kernel mode. In a case where the transit to the kernel mode is decided, the VM management unit 116 instructs the context switch control unit 114 to perform the switch of the operation mode.

As described above, the instruction for the switch of the user mode and the kernel mode is not necessarily issued from the guest OS 121 to the hypervisor 11, and to be more specific, at the time of the switch to the user mode, the instruction is notified from the guest OS 121. On the other hand, the hypervisor 11 needs independently perform the transition from the user mode to the kernel mode in accordance with the interruption, the exception, or the like generated by the CPU 104. Therefore, a set of information switched between the user mode and the kernel mode (for example, the valid page tables or the like) are suitably managed as pairs in the hypervisor 11.

The processing in FIG. 21 is started in accordance with the instruction from the VM management unit 116 that is performed in accordance with the above-mentioned instruction from the guest OS 121 to the switch to the user mode or in accordance with the interruption, the exception, or the like.

In step S161, the context switch control unit 114 determines whether or not the switch of the operation mode of the guest OS 121 is requested. The current operation mode of the guest OS 121 is saved as a part of the VM management information. It is noted that the replacement of the VM management information is carried out at the time of the switch of the process in the VM 12 (the guest OS 121).

The processing in step S161 has a significance in the case of the switch to the kernel mode, in particular. As the switch to the user mode is regularly carried out in the kernel mode, in the case of the switch to the user mode, it is regularly determined that the switch of the operation mode is requested. At that time, the operation mode in the VM management information is changed to the operation mode (the user mode) at the switch destination.

On the other hand, in a case where the transit to the kernel mode is performed, the context switch control unit 114 determines that the switch of the operation mode is requested in accordance with the instruction from the VM management unit 116 in a case where the operation mode in the VM management information is the user mode. In this case, the VM management information does not necessarily be changed by the context switch control unit 114. The VM management information may be changed by the VM management unit 116.

In a case where the context switch control unit 114 determines that the switch of the operation mode is requested (S161: YES), the valid page table is determined on the basis of the page table correspondence list 118 corresponding to the VM 12 where the guest OS 121 as the switch target operates (S162). To be more specific, the context switch control unit 114 searches the entry corresponding to the currently executed process from the relevant page table correspondence list 118. In the searched entry, among the page table address for the user and the page table address for the kernel, on the basis of which one is matched with the current page address, the context switch control unit 114 determines the valid page table. That is, if the page table address for the user is matched, the valid page table is the page table for the user. If the page table address for the kernel is matched, the valid page table is the page table for the kernel.

Subsequently, the context switch control unit 114 decides the domain access right on the basis of the valid page table and the operation mode at the switch destination (S163). The decision method for the domain access right is as described in FIG. 6. It is noted that the content of FIG. 6 may be incorporated as a logic of the context switch control unit 114 or may also be saved in the auxiliary storage device 102 as being separated from the context switch control unit 114.

Subsequently, the context switch control unit 114 sets the decided domain access right in the MMU 105 with regard to the domain numbers of all the domains utilized by the guest OS 121 that is the switch target of the operation mode (S164). That is, the relevant domain access right is common with respect to all the relevant domains. It is noted that all the domains utilized by the guest OS 121 that is the switch target of the operation mode are determined on the basis of the domain utilization list 119. The access right with respect to the domain numbers other than the domains utilized by the guest OS 121 is not changed.

Subsequently, the context switch control unit 114 performs the replacement of register of the CPU 104 (S165). To be more specific, in the case of the switch from the kernel mode to the user mode, the context switch control unit 114 reconstructs the context in the user mode of the guest OS 121. According to this, the control is transited onto the guest OS 121, and the guest OS 121 starts the operation in the user mode.

On the other hand, in the case of the transition from the user mode to the kernel mode, the hypervisor 11 (the VM management unit 116) performs a control so that the guest OS 121 executes the processing from the entry point at the time of the kernel mode. At that time, the VM management unit 116 also notifies the guest OS 121 of the context at the time of the user mode. In general, the relevant context is piled up on a stack and notified. The guest OS 121 performs the processing at the time of the interruption or the exception in the kernel mode. After the end of the relevant processing, the guest OS 121 notifies the hypervisor 11 of the switch to the user mode.

It is noted that for the context switch of the hypervisor 11, the switch between the VMs 12, the switch of the process in the VM 12, and the like also exist. The context switch control unit 114 is specialized for the switch of the user mode and the kernel mode with regard to the guest OS 121.

As apparent from FIG. 21, according to the first embodiment, the valid page table may not be switched in accordance with the change in the operation mode of the guest OS 121. Therefore, it is possible to eliminate the use of the flush of the TLB 151. However, an inconsistency occurs between the operation mode and the valid page table. It is noted that with the domain access right, the access right to be permitted is restricted to or below the smallest access right among the access rights at the two privilege levels. This is because the MMU 105 controls the memory access while putting a priority on the domain access right. Therefore, the memory access beyond the original access right is appropriately restricted.

Figure 22:
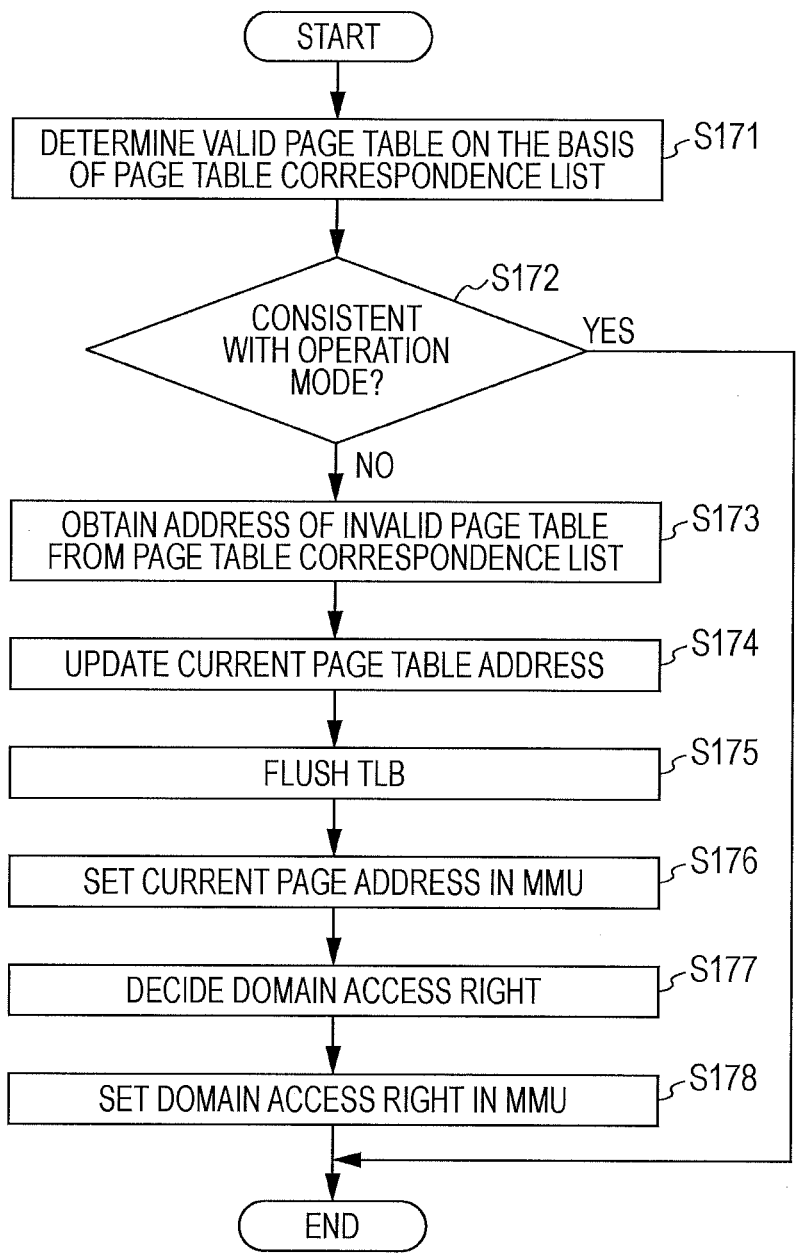
FIG. 22 is a flow chart for describing a processing procedure executed by a fault processing unit according to the first embodiment.

Subsequently, FIG. 22 is a flow chart for describing a processing procedure executed by a fault processing unit according to the first embodiment. The flow chart in the same drawing corresponds to the processing content described in FIG. 9.

The fault (exception) generated by the CPU 104 includes various types. For example, the fault includes a situation in which a page that is accessed does not exist, an exception generated at the time of the memory access as no access right exists, an exception generated at the time of the execution by the CPU 104 while a division by 0 is carried out or an undefined command is attempted to be executed, and the like.

The fault processing unit 115 according to the present embodiment executes a processing with respect to the exception generated at the time of the memory access. In addition, the exception generated at the time of the execution by the VM 12 is set as the target instead of the time of the execution by the hypervisor 11. Furthermore, in the case of the domain fault generated in a case where the memory access is attempted to be carried out beyond the domain access right and the access violation generated when the access right set for the entry of the page table is violated, the fault processing unit 115 is called (the processing in FIG. 22 is started).

In step S171, the fault processing unit 115 determines the valid page table on the basis of the page table correspondence list 118 corresponding to the VM 12 where operates the guest OS 121 that becomes the fault generation factor (hereinafter, which will be referred to as "current guest OS 121"). The determination method for the valid page table based on the page table correspondence list 118 is as described in step S162 of FIG. 21, and therefore a description will be omitted herein. It is noted that the guest OS 121 that becomes the fault generation factor may be identified on the basis of the VM management information.

Subsequently, the fault processing unit 115 determines whether or not the valid page table is consistent with the current operation mode of the current guest OS 121 (S172). That is, it is determined whether or not the valid page table corresponds to the current operation mode of the current guest OS 121. In a case where the valid page table is consistent with the current operation mode of the guest OS 121 (S172: YES), the processing of FIG. 22 is ended. That is, in a case where the valid page table is the page table for the user and the current operation mode of the guest OS 121 is the user mode or a case where the valid page table is the page table for the kernel and the current operation mode of the guest OS 121 is the kernel mode, the processing of FIG. 22 is ended. This is because the switch of the page table is not requested as the fault in this case is the violation against the original access right in accordance with the operation mode (that is, the access right of the entry of the page table). In other words, irrespective of the situation in which the valid page table and the operation mode are consistent with each other, no significance is obtained if an inconsistency occurs between the valid page table and the operation mode by switching the valid page table.

It is noted that the current operation mode of the current guest OS may be obtained from the VM management information.

In a case where the valid page table is not consistent with the current operation mode of the guest OS 121 (S172: NO), the fault processing unit 115 obtains the address of the invalid page table from the entry corresponding to the currently executed process in the page table correspondence list 118 related to the current guest OS (S173). Subsequently, the fault processing unit 115 updates the current page address of the relevant entry with the obtained address (S174).

Subsequently, the fault processing unit 115 causes the MMU 105 to execute the flush of the TLB 151 (S175). Subsequently, the fault processing unit 115 sets the current page address in the MMU 105 as the address of the valid page table (S176). Subsequently, the fault processing, unit 115 decides the domain access right on the basis of the page table that newly becomes valid and the current operation mode of the current guest OS 121 (S177). The decision method for the domain access right is as described in FIG. 6.

Subsequently, with regard to the domain numbers of all the domains utilized by the current guest OS 121, the fault processing unit 115 sets the decided domain access right in the MMU 105 (S178). It is noted that all the domains utilized by the current guest OS 121 are determined on the basis of the domain utilization list 119.

After this, to transit the control onto the guest OS 121, the context saved at the time of the fault generation is reconstructed, and the processing of the guest OS 121 is resumed from the context before the fault generation.

Through the execution of FIG. 22, the inconsistency between the valid page table and the operation mode is corrected. Also, the domain access right is set as "flag". Therefore, after the execution of FIG. 22, the MMU 105 uses the page table in accordance with the operation mode to control the memory access.

As described above, according to the first embodiment, it is possible to delay the timing for the flush of the TLB 151. That is, it is possible to reduce the number of occasions when the TLB 151 is flushed.

Also, finally, as the memory access is controlled on the basis of the access right of the entry of the page table, it is substantially possible to set the access rights in all the combinations with respect to one domain.

Furthermore, the setting of the access right for the non-privilege mode of the page table does not necessarily need to be changed at the time of the virtualization. Therefore, at the time of the virtualization, it is not requested to perform a large design change for the memory map of the guest OS 121. That is, it is possible to appropriately protect the memory access at the privilege level allocated to the OS of the virtualization environment (the guest OS 121).

It is noted that according to the first embodiment, the ASID does not contribute with regard to the switch of the operation mode of the guest OS 121. It is noted that it does not mean that a significance of assigning the ASID to the entry of the TLB 151 does not exist. This is because the flush of the TLB 151 may be restrained by assigning the ASID to the entry of the TLB 151 at the time of the switch between the processes on the guest OS 121, the switch between the VMs 12, and the like. That is, the first embodiment is not exclusive with respect to the scheme in which the ASID is allocated to each process (for each virtual address space).

Next, the second embodiment will be described. According to the second embodiment, different points from the first embodiment will be described.

The second embodiment takes into account a global or a local which is one of page attributions. A global page refers to a page in which a flag (global flag) indicating that this is global is set in the entry of the page table and is used commonly by a plurality of virtual address spaces (processes). A local page refers to a page set to be local (which is not global) to the global flag for the entry of the page table and corresponds to one virtual address space (process). Whether the respective pages are set to be global or local is decided in accordance with a type of the OS (implementation related to the memory map of the OS). For example, in a certain OS, a page corresponding to the kernel space may be set as global, and a page corresponding to the user space may be set as local. In another OS, all the pages corresponding to the kernel space and the user space may be set as local.

With regard to the local page, the ASID becomes valid. That is, with regard to the local page, when the entry of the page table is cached in the TLB 151, the MMU 105 assigns the exclusively set ASID to the MMU 105. On the other hand, with regard to the global page, the ASID is invalid. That is, the MMU 105 does not assign the ASID with regard to the global page when the entry of the page table caches the TLB 151. This is because, with this configuration, for example, at the time of the flush of the TLB 151, it is possible to exclude the entry to which the ASID is not assigned from the flush target, and the higher efficiency of the cache may be realized.

According to the second embodiment, a case is regarded as a presupposition in which all the spaces of the virtual address space correspond to the local page. That is, the second embodiment may be applied with regard to the guest OS 121 for generating the virtual address space so that all the spaces correspond to the local page. It is noted that in a precise sense, the virtual address space in the virtualization environment includes in addition to a hypervisor space the user space and the kernel space. It is noted that according to the present embodiment, all the virtual address spaces refer to spaces except for the hypervisor space for convenience sake.

The state in which the case of all the spaces of the virtual address space correspond to the local page is set as the presupposition means that it is possible to regularly effectively utilize the ASID according to the second embodiment. Therefore, as means for suppressing the flush of the TLB 151 at the time of the switch of the operation mode of the guest OS 121, the second embodiment is different from the first embodiment in that the ASID is effectively utilized.

Figure 23:
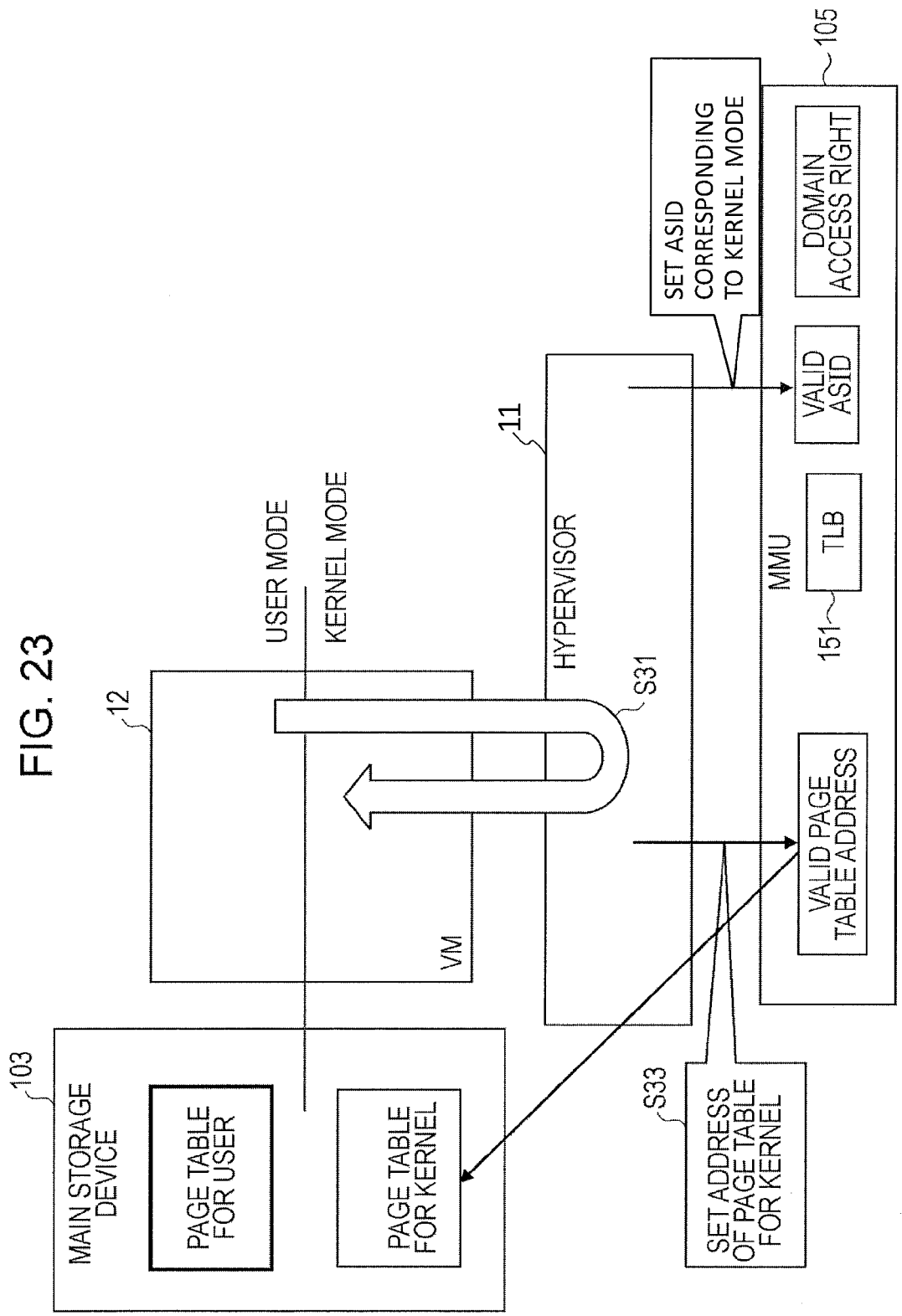
FIG. 23 is an explanatory diagram for describing an example of a processing content at the time of an operation mode switch according to the second embodiment.

FIG. 23 is an explanatory diagram for describing an example of a processing content at the time of an operation mode switch according to the second embodiment. An initial state in the same drawing is similar to FIG. 7. That is, the operation mode before the switch is assumed as the user mode. Also, the valid page table before the switch of the operation mode is assumed as the page table for the user. That is, in the MMU 105, the address of the page table for the user is registered.

When the switch from the user mode to the kernel mode is detected (S31), the hypervisor 11 sets the ASID corresponding to the kernel mode at the switch destination in the MMU 105 (S32). That is, according to the second embodiment, the ASID having a mutually different value is allocated for each operation mode of the guest OS 121. To be more specific, in general, by the guest OS 121, in addition to one ASID allocated to the process of the user, the ASID for the kernel mode is further allocated.

Therefore, the ASID is allocated to each of the user mode and the kernel mode. Subsequently, the hypervisor 11 sets the address of the page table for the kernel in the MMU 105 (S33). That is, the page table for the kernel is exclusively validated.

It is noted that the domain access right set in the MMU 105 is fixedly set as "flag". That is, regularly, the memory access is controlled on the basis of the access right with respect to the non-privilege mode of the entry of the valid page table.

According to the second embodiment, as all the pages are local, when the entry of the page table is cached, regularly, the ASID corresponding to the relevant page table is assigned. Therefore, the entry of the page table for the user mode and the entry of the table for the kernel mode may coexist in the TLB 151 around the same time. Therefore, it is possible to suppress the flush of the TLB 151 at the time of the switch of the operation mode of the guest OS 121. Also, as the operation mode of the guest OS 121 and the valid page table regularly interlock with each other, it is possible to perform the control on the memory access based on the access right in accordance with the operation mode.

The information processing apparatus 10 according to the second embodiment will be described.

In step S102 (FIG. 12), the ASID setting unit 122 allocates ASIDs (that is, two ASIDs) having different values for each operation mode to the generated process.

Therefore, in step S112 (FIG. 13), to the ASID management list 117, the ASID management unit 111 adds the entry associates with the two ASIDs.

Figure 24:
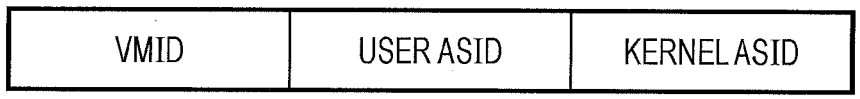
FIG. 24 illustrates a configuration example of the entry of the ASID management list according to the second embodiment.

FIG. 24 illustrates a configuration example of the entry of the ASID management list according to the second embodiment. As illustrated in the same drawing, the entry of the ASID management list 117 according to the second embodiment includes items for storing a user ASID and a kernel ASID in addition to the VMID. The user ASID is an ASID corresponding to the user mode. The kernel ASID is an ASID corresponding to the kernel mode.

It is noted that like the first embodiment, the ASID setting unit 122 may allocate one ASID with respect to one process, and for example, in step S112, the ASID management unit 111 may allocate another ASID.

Also, for example, in step S152 (FIG. 19), the domain management unit 113 sets the domain access right having "flag" as the value with respect to the notified domain number in the MMU 105. It is noted that the domain access right is not changed with respect to the domain number other than the domain number used by the guest OS 121.

Figure 25:
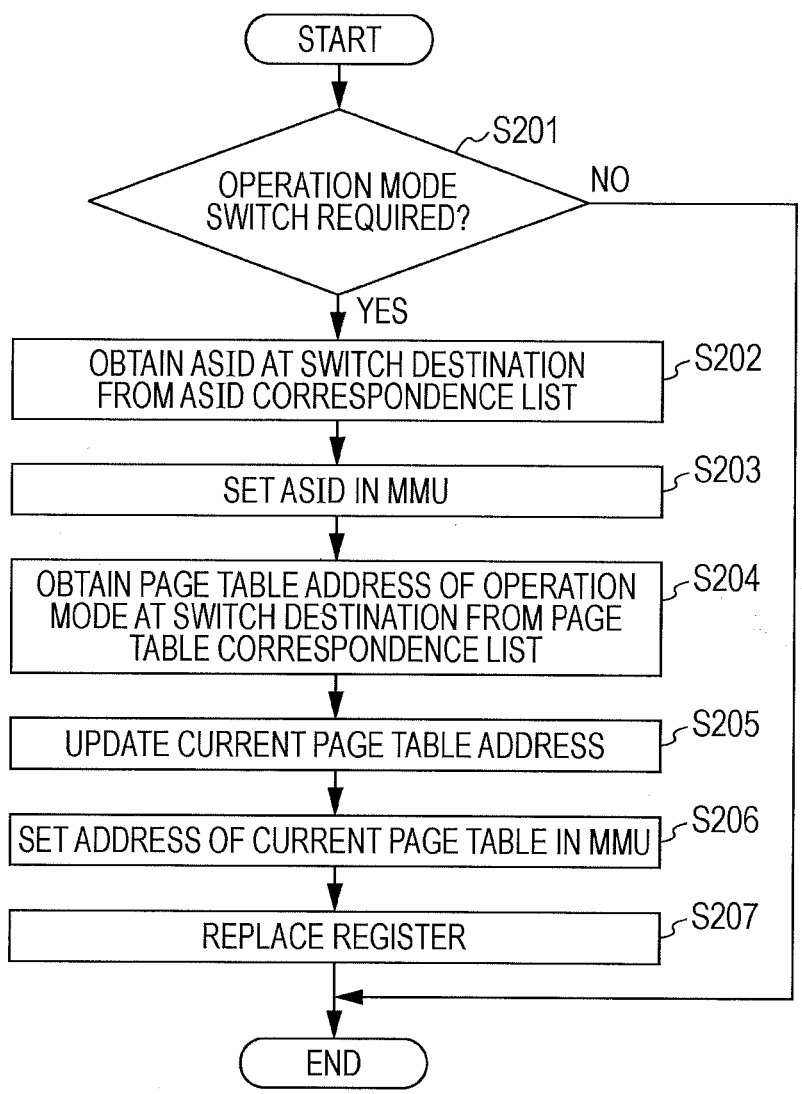
FIG. 25 is a flow chart for describing a processing procedure executed by the context switch control unit according to the second embodiment.

Also, FIG. 25 is a flow chart for describing a processing procedure executed by the context switch control unit according to the second embodiment.

In step S201, the context switch control unit 114 determines whether or not the switch of the operation mode of the guest OS 121 is requested. The processing content of the relevant step is similar to step S161 of FIG. 21. If the switch of the operation mode is not requested, the processing is ended.

In a case where the context switch control unit 114 determines that the switch of the operation mode is requested (S201: YES), the ASID corresponding to the operation mode at the switch destination is obtained from the entry corresponding to the currently executed process of the ASID management list 117 corresponding to the VM 12 where the guest OS 121 as the switch target (hereinafter, which will be referred to as "current guest OS 121") operates (S202). It is noted that like the operation mode of the guest OS 121, the valid ASID may be saved in the VM management information. In that case, the ASID that forms a pair with the ASID saved in the VM management information may be obtained from the ASID management list 117. Furthermore, if the ASID that forms a pair with the valid ASID is also saved in the VM management information, it is not requested to refer to the ASID management list 117, and the higher speed of the processing may be realized. It is however noted that it is requested to update the VM management information at an appropriate time.

Subsequently, the context switch control unit 114 sets the obtained ASID in the MMU 105 (S203). The ASID set in the MMU 105 exclusively validated. Subsequently, the context switch control unit 114 obtains the address of the page table corresponding to the operation mode at the switch destination from the entry corresponding to the currently executed process of the page table correspondence list 118 related to the current guest OS 121 (S204). To be more specific, among the page table address for the user and the page table address for the kernel in the relevant entry, an address different from the current page address is obtained. That is, the page table address that forms a pair with the address of the page table currently set in the MMU 105 is obtained. It is noted that the address of the valid page table may be saved in the VM management information. In that case, an address that forms a pair with the address saved in the VM management information may be obtained from the page table correspondence list 118. Furthermore, if a page table that forms a pair with the valid page table is also saved in the VM management information, it is not requested to refer to the page table correspondence list 118, and the higher speed of the processing may be realized. It is noted that it is requested to update the VM management information at an appropriate time.

Subsequently, the context switch control unit 114 updates the current page table address of the entry corresponding to the currently executed process in the page table correspondence list 118 related to the current guest OS 121 with the obtained address (S205). Subsequently, the context switch control unit 114 sets the current page table address in the MMU 105 (S206). Subsequently, the context switch control unit 114 performs the replacement of register of the CPU 104 (S207).

After the execution of FIG. 25, the MMU 105 performs a control on the memory access by the access right of the entry of the page table in accordance with the operation mode of the guest OS 121.

It is noted that according to the second embodiment, the domain access right does not necessarily need to be updated by the context switch control unit 114. This is because according to the second embodiment, the domain access right is fixed to "flag".

Also, according to the second embodiment, the processing by the fault processing unit 115 is not requested. This is because a consistency between the valid page table and the operation mode of the guest OS 121 is regularly realized, and the correction on the inconsistency by the fault processing unit 115 is not requested.

As described above, according to the second embodiment, with regard to the guest OS 121 with which all the virtual address spaces correspond to the local page, by switching the ASID to the valid page table, it is possible to suppress the flush of the TLB 151. Also, with the access right in accordance with the operation mode, it is possible to control the memory access.

Furthermore, the setting of the access right for the non-privilege mode of the page table does not necessarily need to be changed at the time of the virtualization. Therefore, at the time of the virtualization, it is not requested to perform a large design change for the memory map of the guest OS 121.

Herein, a relation between the first embodiment and the second embodiment will be described. The first embodiment may be implemented irrespective of whether or not all the pages with respect to the virtual address space are local. On the other hand, the second embodiment may be implemented only in a case where all the pages with respect to the virtual address space are local. That is, a range where the second embodiment may be implemented has a relation to be included in a range where the first embodiment may be implemented. Herein, in a range where the two embodiments are overlapped with each other (that is, the processing related to the guest OS 121 that generates the virtual address space in which all the pages are local), it may be mentioned that the second embodiment is more advantageous. According to the first embodiment, this is because while the number of the occasions for the flush of the TLB 151 is only decreased, according to the second embodiment, it is not requested to flush the TLB 151.

Accordingly, in the information processing apparatus 10, in a case where the guest OS 121 that generates the virtual address space in which all the pages are local and the guest OS 121 that does not generate the virtual address space in which all the pages are local coexist, in accordance with the guest OS 121, it may be mentioned that it is advantageous if the first embodiment or the second embodiment may be implemented by the hypervisor 11. It is noted that in the following description, the type of the guest OS 121 that generates the virtual address space in which all the pages (except for the pages related to the hypervisor space) are local is referred to as "local". Also, a type of the OS that does not generate the virtual address space in which all the pages are local is referred to as "global". It is noted that in the above-mentioned classifications, even when the type of the guest OS 121 is local, the guest OS 121 that allocates one ASID to one process is classified as "global". In this case, this is because the entry of the page table in the two operation modes may not be distinguished on the TLB 151, and the second embodiment may not be implemented.

To change the embodiment of the hypervisor 11 in accordance with the guest OS 121, it is requested for the hypervisor 11 (the context switch control unit 114) to distinguish whether the type of the guest OS 121 related to the switch of the operation mode is local or global.

In view of the above, for example, when the domain numbers of the domains used by the relevant guest OS 121 is notified (FIG. 18: S142), the domain setting unit 124 of the respective guest OSs 121 notifies of a flag indicating whether or not the pages belonging to the relevant domain are all local (hereinafter, which will be referred to as "global flag"). For example, the global flag with respect to the domain where at least one global page belongs to the domain is set as "1", and the global flag with respect to the domain where the global page does not belong to the domain is set as "0". It is noted that the guest OS 121 generates the virtual address space by itself and decides the domain allocation by itself. Therefore, the domain setting unit 124 included in the guest OS 121 knows whether the page belonging to the respect domains is local or global in advance.

In step S152 (FIG. 19), the domain management unit 113 of the hypervisor 11 receiving the relevant notification registers the entry including the global flag in the domain utilization list 119 for each notified domain number. Therefore, the entry of the domain utilization list 119 in this case is extended in the following manner.

Figure 26:
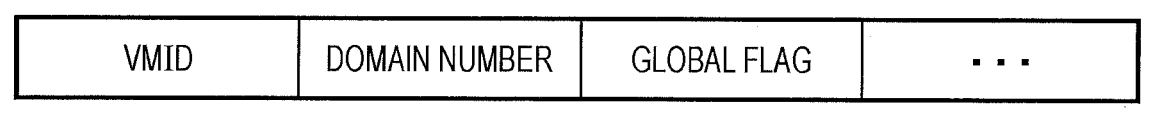

FIG. 26 illustrates a configuration example of an entry of an extended domain utilization list. As illustrated in the same drawing, in the extended domain utilization list 119, the global flag is recoded for each domain number.

It is noted that in a case where the domain management unit 113 automatically or actively registers the domain number, the domain management unit 113 may determine whether the domain is global or local by checking the global flag for the page table entry. In this case, the addition or deletion of the domain may not be carried out by the domain setting unit 124.

The context switch control unit 114 may utilize the extended domain utilization list 119 to determine a type of the guest OS 121 that is the switch target of the operation mode. To be more specific, in a case where the switch of the operation mode of the guest OS 121 is notified, the context switch control unit 114 refers to the global flags with respect to all the domain numbers of the domain utilization list 119 related to the guest OS 121 as the switch target. If the values of the global flag are "0" with respect to all the domain numbers, it is determined that the type of the relevant guest OS 121 is local. Therefore, in this case, the context switch control unit 114 executes the second embodiment (FIG. 25). It is noted that if the values of the two ASIDs registered in the entry corresponding to the currently executed process of the ASID management list 117 related to the relevant guest OS 121 are the same, the context switch control unit 114 executes the first embodiment (FIG. 21).

On the other hand, if the value of the global flag is "1" with regard to at least one domain number, the context switch control unit 114 executes the first embodiment (FIG. 21).

Also, the ASID management list 117 may be utilized for the determination as to which embodiment is implemented by the context switch control unit 114. That is, in a case where the two different ASIDs are registered the target entry, the second embodiment may be executed. In other cases, the first embodiment may be executed.

It is noted that to unify formats of the entries of the ASID management list 117 for the first embodiment and the second embodiment, according to the first embodiment too, two ASIDs may be registered. In this case, the two ASIDs may have the same value.

Also, in a case where a fault which is a processing target by the fault processing unit 115 with regard to the guest OS 121 whose type is local is generated, the fault processing unit 115 executes nothing. That is, with regard to the guest OS 121 whose type is local, as the second embodiment is implemented by the context switch control unit 114, no inconsistence occurs between the operation mode of the guest OS 121 and the valid page table. This is because, therefore, through the determination in step S172 (FIG. 22), the processing by the fault processing unit 115 is ended. Thus, in a case where the second embodiment is implemented, no inconvenience occurs from the existence of the fault processing unit 115.

In this manner, the first embodiment and the second embodiment are in a relation where the coexistence may be realized instead of an exclusive relation. Alternatively, it may be mentioned that the second embodiment improve a part of the first embodiment.

It is noted that in a case where the hypervisor 11 only corresponding to the guest OS 121 whose type is local is mounted, the second embodiment may also be executed along. In this case, a concept equivalent to the domain is not needed. This is because according to the second embodiment, the domain access right is fixed to "flag", and the significance of the existence does not substantially exist. According to the second embodiment, a reason why the domain access right is set in the MMU 105 is that the MMU 105 is an MMU that may set the domain access right. Therefore, if the MMU used when the second embodiment is implemented does not correspond to the domain, according to the second embodiment, the processing related to the domain may be eliminated.

Next, a third embodiment will be described. With regard to the third embodiment, different points from the first and second embodiments will be described. According to the third embodiment, with regard to one virtual address space, a case where the local domain and the global domain exist in a mixed manner will be described. In other words, a processing executed with respect to the guest OS 121 that generates the virtual address space in which the local domain and the global domain exist in a mixed manner will be described. Therefore, according to the third embodiment, a property that the domain has for sorting out the pages (the entries of the page table) effectively functions.

The local domain refers to a domain where all the pages belonging to the relevant domain are local. The global domain refers to a domain where at least one page belonging to the relevant domain is global.

Figure 27:
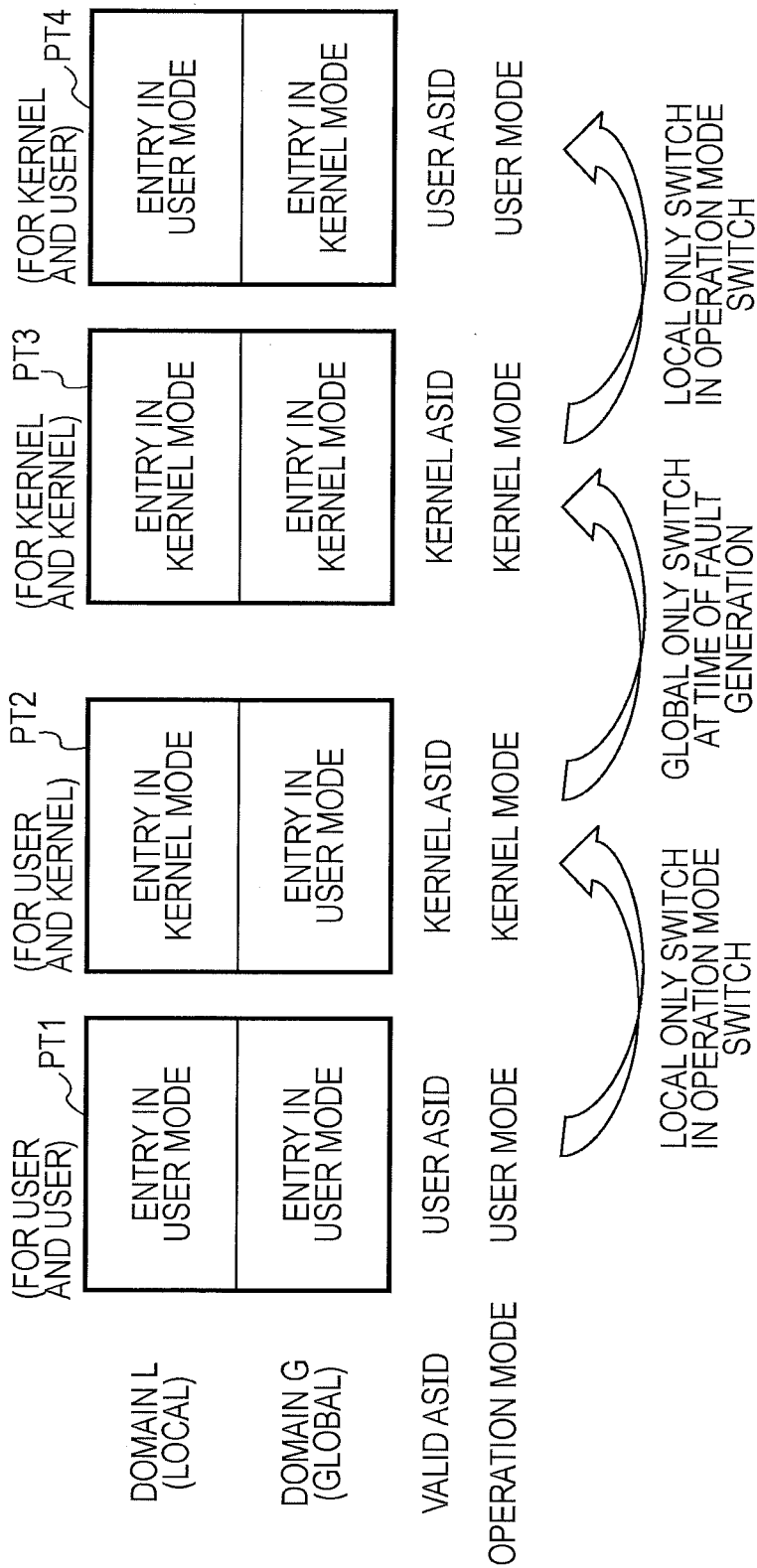
FIG. 27 is an explanatory diagram for describing a transition example of a valid page table and a valid ASID according to a third embodiment.

FIG. 27 is an explanatory diagram for describing a transition example of a valid page table and a valid ASID according to the third embodiment. In the same drawing, for convenience sake, with regard to one virtual address space, two domains are allocated in which one is set as the local domain (hereinafter, which will be referred to as "domain L") and the other one is set as the global domain (hereinafter, which will be referred to as "domain G").

In this case, according to the present embodiment, four pages are allocated with respect to one process (the virtual address space). In the same drawing, a transit example of these four page tables PT1 to PT4 is illustrated. The respective page tables are represented separately in two parts in upper and lower sections. The upper section illustrates an entry related to the domain L. The lower section illustrates an entry related to the domain G.

The page table PT1 is a page table in which the access right of the non-privilege mode of the entry related to the domain G and the access right of the non-privilege mode of the entry related to the domain L are set as the access right of the user mode. It is noted that the page table PT1 is also referred to as "page table for the user and the user".

The page table PT2 is a page table in which the access right of the non-privilege mode of the entry related to the domain G is set as the access right of the user mode and the access right of the non-privilege mode of the entry related to the domain L is set as the access right of the kernel mode. It is noted that the page table PT2 is also referred to as "page table for the user and the kernel".

The page table PT3 is a page table in which the access right of the non-privilege mode of the entry related to the domain G and the access right of the non-privilege mode of the entry related to the domain L are set as the access right of the kernel mode. It is noted that the page table PT3 is also referred to as "page table for the kernel and the kernel".

The page table PT4 is a page table in which the access right of the non-privilege mode of the entry related to the domain G is set as the access right of the kernel mode and the access right of the non-privilege mode of the entry related to the domain L is set as the access right of the user mode. It is noted that the page table PT4 is also referred to as "page table for the kernel and the user".

It is noted that the number of the ASIDs allocated with respect to one process (the virtual address space) may be two. That is, it suffices that the number of the ASIDs provided may be the number of privilege levels to be realized on the guest OS 121. In the same drawing, below the respective page tables, the valid ASID is illustrated. Also, below the valid ASID, the operation mode of the guest OS 121 is illustrated.

Herein, the entry related to the local domain L may be cached in the TLB 151 while being associated with the ASID. On the other hand, it is not necessarily possible to cache the entry related to the global domain G in the TLB 151 while being associated with the ASID. According to the third embodiment, by utilizing the above-mentioned characteristics of the two domains, it is configured that the second embodiment is applied to the domain L, and the first embodiment is applied to the domain G.

Among the four page tables, one page table is exclusively validated. For example, in a case where the operation mode of the guest OS 121 is the user mode and the page table PT1 is valid, the switch to the kernel mode is supposed to occur. In a case where the switch of the operation mode occurs, as the first embodiment is not applied to the global domain G, the switch of the entry of the page table is not desired to be performed. On the other hand, as the second embodiment is desired to be applied to the local domain L, the switch to the entry where the access right corresponding to the operation mode at the switch destination (the kernel mode) is set is desired. Accordingly, in this case, it suffices that the page table PT2 is exclusively validated. In actuality, as a problem, all the entries of the valid page table are switched, and the switch occurs also with regard to the entry of the domain G. However, in the page table PT1 and the page table PT2, the contents of the entries with respect to the domain G are the same. Therefore, substantially, it is possible to obtain the same effect as the case in which the switch does not occur with regard to the domain G. It is noted that the entry is also substantially switched with regard to the local domain L, and like the second embodiment, the valid ASID is switched to the kernel ASID.

Subsequently, the domain fault or the access violation is supposed to occur. In this case, as the first embodiment is desired to be applied to the global domain G, the switch to the entry in accordance with the operation mode is desired. On the other hand, as the second embodiment is desired to be applied to the local domain L, the switch to the entry of the page table is not desired. Accordingly, it suffices that the page table PT3 is exclusively validated. It is noted that as the switch of the entry does not occur substantially with regard to the local domain L, the valid ASID is not switched.

Subsequently, when the switch of the operation mode occurs, in a same manner as the switch from the page table PT1 to the page table PT2, the switch from the page table PT3 to the page table PT4 is executed.

It is noted that even when the number of the page tables is four, the entry with respect to the local domain L substantially has two types corresponding to the operation mode. Therefore, it suffices that two ASIDs may be used.

In FIG. 27, in a state in which the operation mode of the guest OS 121 is the kernel mode and the page table PT2 is valid, with regard to the entry related to the domain G of the page table, an inconsistence with the operation mode occurs. Also, in a state in which the operation mode of the guest OS 121 is the user mode and the page table PT4 is valid, with regard to the entry related to the domain G of the page table PT4, an inconsistence with the operation mode occurs. That is, after the switch of the operation mode, until a time when the domain fault or the access violation is generated, with regard to the entry related to the domain G of the valid page table, an inconsistency with the operation mode occurs. As a measure for the access protection with respect to the above-mentioned inconsistence, like the first embodiment, the domain is utilized. That is, on the basis of the domain access right, the memory access beyond the original access right is prevented in a state in which the inconsistence occurs. According to the third embodiment, the domain access right is decided as illustrated in FIG. 28.

FIG. 28 is an explanatory diagram for describing a decision method for a domain access right according to the third embodiment. The way of looking at the same drawing is the same as FIG. 6. According to the third embodiment, a difference is that the number of columns is increased as the page tables have four types. It is noted that the value of the domain access right illustrated in the same drawing is related to the global domain G. With regard to the local domain L, as it suffices that "flag" is fixed, the illustration is omitted.

As illustrated in FIG. 28, in a case where the access right of the entry of the domain G of the valid page table is higher than (or wider than) the operation mode of the guest OS 121, the domain access right is set as "access not permitted". The other domain access right is set as "flag".

It is noted that with regard to one virtual address space, two or more local domains L may be allocated. Also, two or more global domains G may be allocated. In a case where two or more local domains L are allocated, in accordance with the increase in the number of the domains L, the types of page tables may not be increased. That is, the types of page tables may be the same as the case in which one domain L is used. This is because with regard to the entries of the domains L, as the switch is carried out in accordance with the switch of the operation mode, the entries of all the domains L are switched in synchronization.

On the other hand, in a case where two or more global domains G are allocated, a significance exists when the number of the types of page tables is increased in accordance with the increase in the number of the domains G. By separately preparing the page tables having entries with a different operation mode corresponding to each domain G, it is possible to limit the entry that is substantially switched when a fault is generated to the entry related to the domain G related to the relevant fault.

Figure 29:
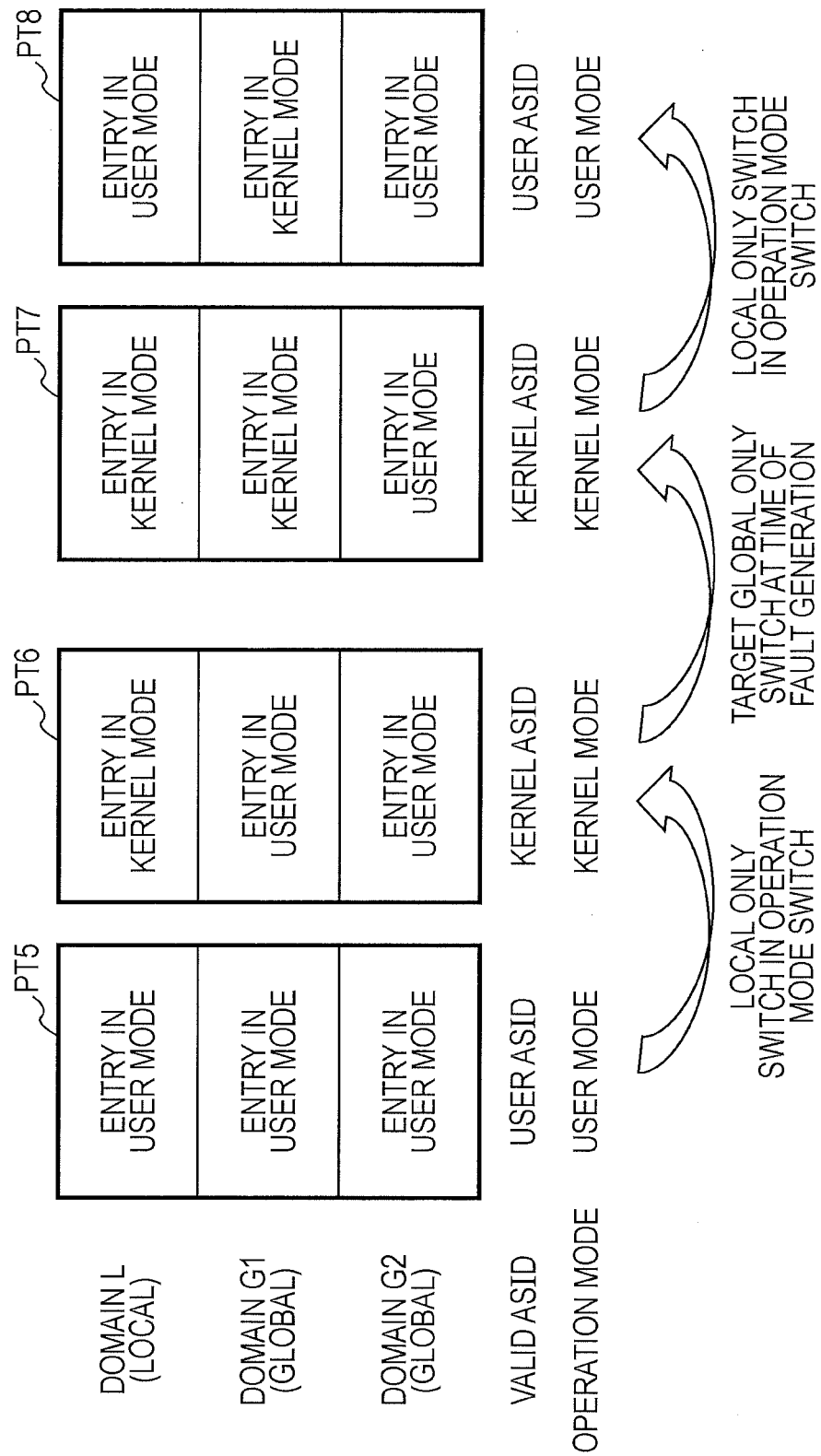
FIG. 29 is an explanatory diagram for describing a significance of separating the page table for each global domain.

FIG. 29 is an explanatory diagram for describing a significance of separating the page table for each global domain. The way of looking at the same drawing is the same as FIG. 27.

In the same drawing, a transit state of a page table PT5 to a page table PT8 is illustrated. It is noted that the respective page tables includes the entry related to the local domain L, the entry related to the global domain G1, and the entry related to the global domain G2. That is, the same drawing illustrates a case in which two global domains are allocated.

First, in a case where the operation mode of the guest OS 121 is the user mode, the page table PT5 is supposed to be the valid page table. In this state, when the operation mode of the guest OS 121 is switched to the kernel mode, the page table PT6 is validated. The page table PT6 has the access right of the entry related to the domain L which is different from that of the page table PT5. Subsequently, a fault is generated in the access to the page related to the domain G1, the page table PT7 is validated. The page table PT7 has the access right of the entry related to the domain G1 which is different from that of the page table PT6. Subsequently, when the operation mode of the guest OS 121 is switched to the user mode, the page table PT8 is validated. The page table PT8 has the access right of the entry related to the domain L which is different from that of the page table PT7.

In the current state, the guest OS 121 is the user mode, and the entry related to the domain G2 corresponds to the user mode. That is, as the entry of the domain G2 is not switched through the interlock with the domain G1, the consistency with the operation mode exists. Therefore, in a state in which the page table PT8 is valid, in a case where the memory access within a range of the original access right is generated with respect to the page related to the domain G2, a fault is not generated. Therefore, the flush of the TLB 151 does not occur.

On the other hand, in a case where the entry of the domain G2 is switched through the interlock with the entry of the domain G1, with regard to the page table PT8, the entry of the domain G2 corresponds to the kernel mode. Therefore, in a case where the memory access within the original access right is generated with respect to the page related to the domain G2, a fault may be generated.

In this manner, with regard to the global domain, if the page table is sorted for each domain, it is possible to reduce the number of occasions when the fault is generated, and the number of occasions when the TLB 151 is flushed is reduced.

In view of the above, the number of requested page tables may be calculated through the following expression (1).

$$2 \times 2^n \quad (1)$$

n denotes the number of the global domains. For example, in the case of FIG. 27, the number of the global domain is one. Therefore, the number of requested page tables becomes $2 \times 2^1 = 4$. Also, in the case of FIG. 29, the number of the global domains is two. Therefore, the number of requested page tables becomes $2 \times 2^2 = 8$.

It is noted that in the expression (1), "2" of the first term corresponds to the number of the operation mode. That is, the expression (1) means that the page tables is generated for each combination of (the types of) the operation modes and (the types of) the domains. Therefore, for example, in a case where the number of the operation modes is two or larger, the value of the first term may be matched with the number of the operation modes.

Hereinafter, the information processing apparatus 10 according to the third embodiment will be described.

According to the third embodiment, along with the extension of the types of the page tables, the page table setting unit 123 generates the page tables by the requested number with respect to the generated process (that is, the virtual address space related to the relevant process) in step S122 (FIG. 15). The requested number is calculated on the basis of the expression (1).

Subsequently, the page table setting unit 123 notifies the page table management unit 112 of the registration instruction of the addresses of the generated page tables (S123).

Also, in step S132 (FIG. 16), the page table management unit 112 adds the entry including a set of the addresses of the page table specified in the registration instruction to the page table correspondence list 118 corresponding to the VM 12 where the page table setting unit 123 that is the relevant registration instruction source operates. Therefore, the relevant entry becomes as illustrated in FIG. 30.

FIG. 30 illustrates a configuration example of the entry of the page table correspondence list according to the third embodiment. The entry of the page table correspondence list 118 illustrated in the same drawing has an item for storing the addresses of the four page table. That is, like FIG. 27, the relevant entry corresponds to the case in which the number of the global domain is one.

The domain utilization list 119 may have a format described in FIG. 26 in which the global flag may be stored. Therefore, the domain setting unit 124 and the domain management unit 113 may execute processings corresponding to the domain utilization list 119 in the relevant format.

Figure 31:
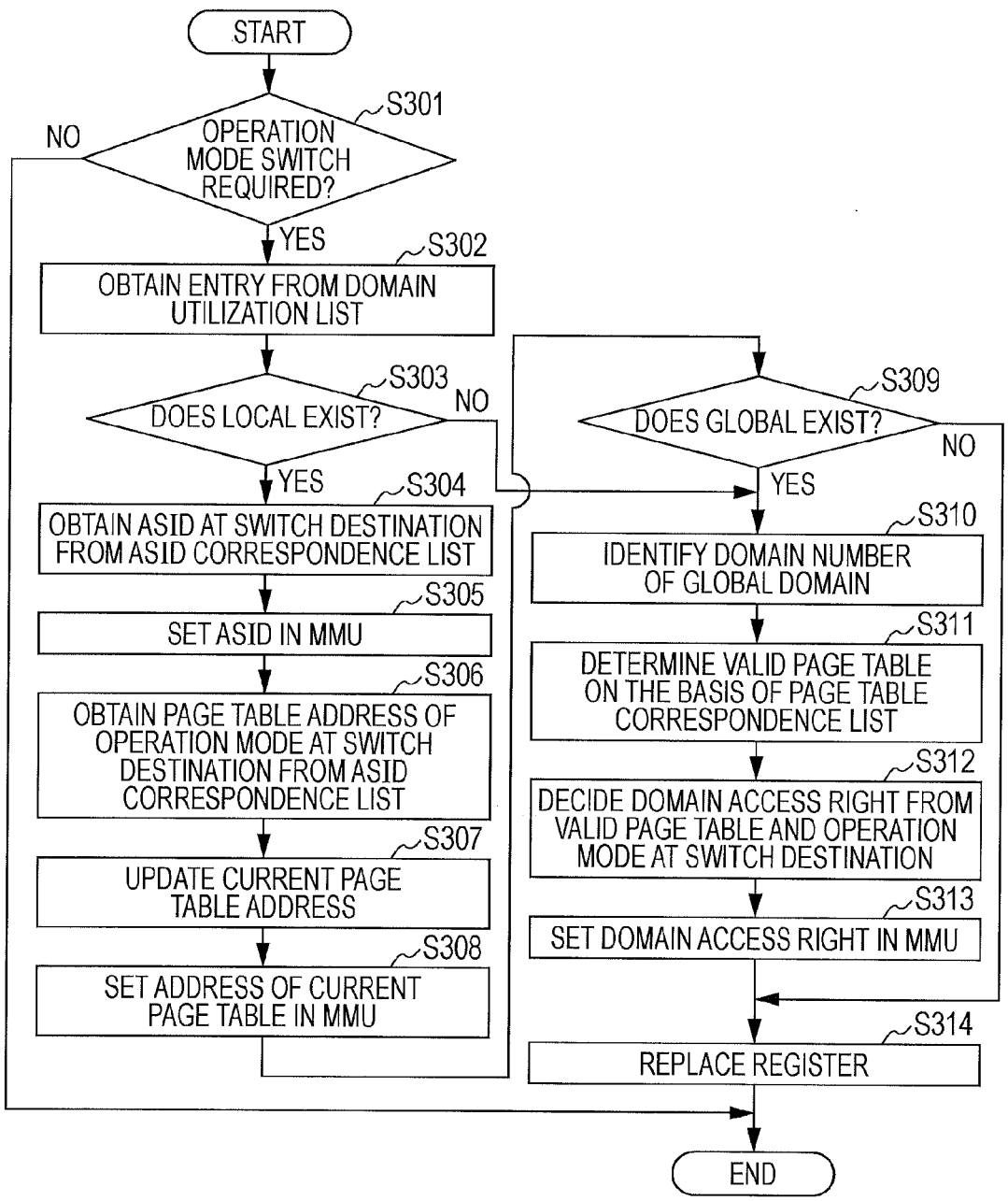
FIG. 31 is a flow chart for describing a processing procedure executed by the context switch control unit according to the third embodiment.

Also, FIG. 31 is a flow chart for describing a processing procedure executed by the context switch control unit according to the third embodiment.

In step S301, the context switch control unit 114 determines whether or not the switch of the operation mode of the guest OS 121 is requested. The processing content of the relevant step is similar to step S161 of FIG. 21. If the switch of the operation mode is not requested, the processing is ended.

In a case where the context switch control unit 114 determines that the switch of the operation mode is requested (S301: YES), the entry of the domain utilization list 119 related to the guest OS 121 as the switch target is obtained (S302), and a determination on whether or not the local domain exists (S303). The presence or absence of the local domain exists may be determined on the basis of the global flag for the obtained entry.

In a case where at least one local domain exist (S303: YES), the context switch control unit 114 executes steps S304 to S308. Processing contents in steps S304 to S308 may be similar to those in steps S202 to S206 of FIG. 25. It is noted that according to the third embodiment, as four or more page tables exist, the content in step S306 is different from that in step S204 to some extent. To be more specific, the address of the page table in which the entry corresponding to the local domain has a different corresponding operation mode from the entry before the switch and the entry corresponding to the global domain has the same (common) corresponding operation mode as the entry before the switch is obtained from the page table correspondence list 118.

Following step S308, the context switch control unit 114 determines whether or not the global domain exists on the basis of the global flag for the entry of the domain utilization list 119 which is obtained in step S302 (S309). In a case where the global domain exists (S309: YES), the context switch control unit 114 identifies the domain number of the global domain on the basis of the entry of the domain utilization list 119 obtained in step S302 (S310). That is, the domain number of the entry in which the global flag is "1" is identifies as the domain number of the global domain.

Subsequently, the context switch control unit 114 executes steps S311 to S313. Processing contents in steps S311 to S313 may be similar to those in steps S162 to S164 of FIG. 21. It is however noted that in step S312, the context switch control unit 114 decides the domain access right through the method described in FIG. 28. Subsequently, with regard to the domain number of the global domain among the domains utilized by the guest OS 121 which is the switch target of the operation mode, the context switch control unit 114 sets the decided domain access right in the MMU 105 (S313). That is, with regard to the domain number identified in step S310, the domain access right is set in the MMU 105. At this time, the domain access right other than the identified domain number is not changed.

It is noted that steps S310 to S313 are executed even in a case where it is determined in step S303 that the local domain does not exist.

Subsequently, the context switch control unit 114 performs the replacement of register of the CPU 104 (S314). It is noted that step S314 is executed even in a case where it is determined in step S309 that the global domain does not exist.

Subsequently, a processing procedure of the fault processing unit 115 according to the third embodiment will be described. The relevant processing procedure may be basically similar to that described in FIG. 22. It is noted that according to the third embodiment, before step S171, the fault processing unit 115 refers to the domain utilization list 119 corresponding to the guest OS 121 (the current guest OS 121) related to the fault to determine whether or not the global domain exists. In a case where the global domain exists, the fault processing unit 115 executes step S171 and subsequent steps.

In step S172, the fault processing unit 115 determines whether or not the entry related to the global domain that is related to the fault is consistent with the current operation mode of the guest OS 121 in the valid page table. It is noted that the global domain related to the fault is identified on the basis of the virtual address notified through the fault. In a case where the entry related to the relevant global domain is not consistent with the current operation mode of the guest OS 121 (S172: NO), the fault processing unit 115 executes step S173 and subsequent steps.

In step S173, the fault processing unit 115 obtains the address of the page table in which only the valid page table and the entry of the relevant global domain are different from the entry corresponding to the currently executed process in the page table correspondence list 118 related to the current guest OS. To be more specific, the following address of the page table is obtained. First, with regard to the relevant entry corresponding to the global domain, this is a page table in which the operation mode corresponding to the entry of the valid page table is different. Also, with respect to the entry corresponding to another global domain and the entry corresponding to the local domain, this is a page table in which the operation mode corresponding to the entry of the valid page table is the same (common).

Also, in step S177, the fault processing unit 115 decides the domain access right through the method described in FIG. 28.

As described above, according to the third embodiment, with regard to the guest OS 121 that generates the virtual address space in which the local domain and the global domain exist in a mixed manner, the number of the occasions for the flush of the TLB 151 may be more reduced as compared with the first embodiment. That is, also according to the first embodiment, with regard to one virtual address space, it is possible to deal with the case in which the local domain and the global domain exist in a mixed manner. This is because according to the first embodiment, it does not matter whether the domain is local or global. It is however noted that according to the third embodiment, the entry related to the local domain of the valid page table is switched through the interlock with the operation mode of the guest OS 121. Therefore, with regard to the memory access related to the local domain, a fault that becomes a factor for the call of the fault processing unit 115 is not generated. Therefore, according to the third embodiment, the number of occasions for the relevant fault generation may be reduced. This means that the number of occasions for the execution of the processing by the fault processing unit 115 (FIG. 22) is reduced. That is, the number of occasions for the flush of the TLB 151 is reduced.

It is noted that a range in which the third embodiment may be applied also encompasses the second embodiment. That is, the third embodiment may also be applied to the case where all the domains related to one virtual address space are local. In this case, through the expression (1), the number of requested page tables becomes two. This value is matched with the second embodiment.

Also, for each domain, and also, for each operation mode of the guest OS 121, the page table setting unit 123 generates page tables (that is, page tables divided for each area of the domain) and notifies the page table management unit 112 of the page tables. In this case, when the valid page table is switched, for example, the context switch control unit 114 or the fault processing unit 115 may assemble page tables like the page tables PT1 to PT4 of FIG. 27 or the page tables PT5 to PT8 of FIG. 29 to be set in the MMU 105. The assembled page tables may be registered in the page table correspondence list 118.

Also, it is possible to reduce the number of previously prepared page tables. It is configured that whether or not the requested page tables are registered in the page table correspondence list 118 may be identified. In a case where a page table that is not registered in the page table correspondence list 118 is requested, the hypervisor 11 notifies the guest OS 121 of a registration request of the relevant page table. The page table setting unit 123 of the guest OS 121 generates the requested page table and notifies the page table management unit 112 of an address of the relevant page table. With this configuration, it is possible to increase a probability that the storage area consumed by the page tables is reduced.

Also, the number of privilege levels (the operation modes) that the present embodiment may cope with is not limited to two. For example, it is supposed that the CPU 104 has three privilege levels. Also, in the entry of the page table, it is supposed that access right of each of the three privilege levels may be set. In the above-mentioned case, it is supposed that two privilege levels are allocated to the hypervisor 11, and in the remaining one privilege level, the three privilege levels are desired to be realized with regard to the guest OS 121. In this case, three page tables may be generated with respect to one process. Also, according to the second or third embodiment, three ASIDs may be allocated with respect to one process.

Also, for example, likes the ARM architecture, an architecture where two page tables may be set in the MMU 105 at the same time also exists. One page table represents an entire 4 GB space, and the other table represents a part of the 4 GB space. This is the system in which by switching only the relevant part to be used, the switch of the process is realized, and the area for the page table for the process is reduced. The present embodiment may be applied to the above-mentioned architecture. It is noted that the page table of the 4 GB space may also be realized while one is registered with respect to the VM 12.

In the above, embodiments of the present invention have been described in detail, but the present invention is not limited to the above-mentioned particular embodiments, and various modifications and alterations may occur insofar as they are within the scope of the appended claims.

With regard to the above-mentioned description, the following section is further disclosed.

The present invention is not limited to the embodiment but may be changed variously without departing from the scope and spirit thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a memory access control program causing an information processing apparatus to execute a memory access control procedure, the memory access control procedure comprising:

accepting addresses of respective page tables generated for each of operation modes having different privilege levels where a first access right in accordance with a first operation mode is set with respect to one virtual address space, from an operating system that manages the virtual address space and associating the addresses with the operating system to be recorded in a page table correspondence information storage;

switching the first operation mode to a second operation mode, and in accordance selectively setting, in a memory management device, a second access right indicating a value lower than or equal to a value of the first access right in an operation mode where the first access right is smaller compared with other operation modes; and setting, when a memory access is identified to be beyond the second access right, an address corresponding to the second operation mode in the memory management device causing execution of a flush of a translation look-aside buffer, and setting the second access right indicating a value for validating the first access right set in the page table related to a relevant address in the memory management device, wherein the memory management device controls memory access related to an address associated with the page table while the second access right is prioritized over the first access right.

2. The computer-readable, non-transitory medium according to claim 1, wherein the memory access control procedure comprising:

generating a page table in which the first access right in accordance with a relevant operation mode is set with respect to one virtual address space for each of the operation modes having the different privilege levels and notifying the operating system of an address of the page table generated.

3. The computer-readable, non-transitory medium according to claim 1, wherein the memory access control procedure comprising:

accepting an identifier allocated for each of the operation modes with respect to the virtual address space from the operating system and recording the identifier in an identifier storage, wherein the switching includes setting, with respect to the virtual address space that does not includes a global page, in accordance with the switch of the operation mode, the identifier corresponding to the second operation mode at a switch destination and the address of the page table in the memory management device, and wherein the memory management device assigns the identifier set in the memory management device and caches an entry of the page table related to the address set in the memory management device in the translation look-aside buffer.

4. The computer-readable, non-transitory medium according to claim 3, wherein the memory access control procedure comprising:

allocating the identifier for each of the operation modes with respect to the virtual address space and notifying the operating system of the relevant identifier.

5. The computer-readable, non-transitory medium according to claim 3, wherein the memory access control procedure comprising:

accepting identification information on a domain that is a sorting unit of the entry of the page table from the operating system and setting the second access right indicating the value for validating the first access right in the memory management device with regard to the domain that is local to which only a local page belongs, wherein the accepting addresses of respective page tables generated includes accepting an address of a page table generated for each of combinations of the operation modes and the domains, wherein the switching includes setting, in accordance with the switch of the operation mode, the address of the page table in which the entry related to the local domain is different with respect to the page table in which the address is set in the memory management device and the entry related to the domain that is global to which a global page belongs is common and the identifier corresponding to the second operation mode at a switch destination in the memory management device and setting the second access right indicating a value smaller than or equal to the value of the first access right corresponding with the global domain in the memory management device, wherein the setting of the address corresponding to the second operation mode includes setting, in accordance with the memory access beyond the second access right, an address of the page table in which the entry related to the local domain is common and the entry related to the global domain is different in the memory management device, causing the memory management device to execute the flush of the translation look-aside buffer, and setting the second access right indicating the value for validating the first access right in the memory management device with regard to the global domain, and wherein the memory management device assigns the identifier set in the memory management device and caches the entry of the page table related to the address set in the memory management device in the translation lookaside buffer with regard to the page related to the local domain, and controls the memory access while the second access right for each domain is prioritized.

6. A memory access control method executed by an information processing apparatus, the memory access control method comprising:

accepting addresses of respective page tables generated for each of operation modes having different privilege levels where a first access right in accordance with a first operation mode is set with respect to one virtual address space, from an operating system that manages the virtual address space and associating the addresses with the operating system to be recorded in page table correspondence information storage;

switching the first operation mode to a second operation mode, and in accordance selectively setting, in a memory management device, a second access right indicating a value lower than or equal to a value of the first access right in an operation mode where the first access right is smaller compared with other operation modes; and setting, when a memory access is identified to be beyond the second access right, an address corresponding to the second operation mode in the memory management device causing execution of a flush of a translation lookaside buffer, and setting the second access right indicating a value for validating the first access right set in the page table related to a relevant address in the memory management device, wherein the memory management device controls memory access related to an address associated with the page table while the second access right is prioritized over the first access right.

7. The memory access control method according to claim 6, comprising:

generating a page table in which the first access right in accordance with a relevant operation mode is set with respect to one virtual address space for each of the operation modes having the different privilege levels and notifying the operating system of an address of the page table generated.

8. The memory access control method according to claim 6, comprising:

accepting an identifier allocated for each of the operation modes with respect to the virtual address space from the operating system and recording the identifier in identifier storage, wherein the switching includes setting, with respect to the virtual address space that does not includes a global page, in accordance with the switch of the operation mode, the identifier corresponding to the second operation mode at a switch destination and the address of the page table in the memory management device, and wherein the memory management device assigns the identifier set in the memory management device and caches an entry of the page table related to the address set in the memory management device in the translation lookaside buffer.

9. The memory access control method according to claim 8, comprising allocating the identifier for each of the operation modes with respect to the virtual address space and notifying the operating system of the relevant identifier.

10. The memory access control method according to claim 8, comprising:

accepting identification information on a domain that is a sorting unit of the entry of the page table from the operating system and setting the second access right indicating the value for validating the first access right in the memory management device with regard to the domain that is local to which only a local page belongs, wherein the accepting addresses of respective page tables generated includes accepting an address of a page table generated for each of combinations of the operation modes and the domains, wherein the switching includes setting, in accordance with the switch of the operation mode, the address of the page table in which the entry related to the local domain is different with respect to the page table in which the address is set in the memory management device and the entry related to the domain that is global to which a global page belongs is common and the identifier corresponding to the second operation mode at a switch destination in the memory management device and setting the second access right indicating a value smaller than or equal to the value of the first access right corresponding with the global domain in the memory management device, wherein the setting of the address corresponding to the second operation mode includes setting, in accordance with the memory access beyond the second access right, an address of the page table in which the entry related to the local domain is common and the entry related to the global domain is different in the memory management device, causing the memory management device to execute the flush of the translation look-aside buffer, and setting the second access right indicating the value for validating the first access right in the memory management device with regard to the global domain, and wherein the memory management device assigns the identifier set in the memory management device and caches the entry of the page table related to the address set in the memory management device in the translation lookaside buffer with regard to the page related to the local domain, and controls the memory access while the second access right for each domain is prioritized.

11. An information processing apparatus comprising:

at least one processor to execute:

accepting addresses of respective page tables generated for each of operation modes having different privilege levels where a first access right in accordance with a first operation mode is set with respect to one virtual address space, from an operating system that manages the virtual address space and associating the addresses with the operating system to be recorded in page table correspondence information storage;

switching the first operation mode to a second operation mode, and in accordance selectively setting, in a memory management device, a second access right indicating a value lower than or equal to a value of the first access right in an operation mode where the first access right is smaller compared with other operation modes; and setting, when a memory access is identified to be beyond the second access right, an address corresponding to the current second mode in the memory management device causing execution of a flush of a translation look-aside buffer, and setting the second access right indicating a value for validating the first access right set in the page table related to a relevant address in the memory management device, wherein the memory management device controls memory access related to an address associated with the page table while the second access right is prioritized over the first access right.

12. The information processing apparatus according to claim 11, wherein at least one processor executes generating a page table in which the first access right in accordance with a relevant operation mode is set with respect to one virtual address space for each of the operation modes having the different privilege levels and an address of the page table generated is notified.

13. The information processing apparatus according to claim 11, wherein at least one processor executes
- accepting an identifier allocated for each of the operation modes with respect to the virtual address space from the operating system and recording the identifier in identifier storage,
- wherein the switching sets, with respect to the virtual address space that does not includes a global page, in accordance with the switch of the operation mode, the identifier corresponding to the second operation mode at a switch destination and the address of the page table in the memory management device, and
- wherein the memory management device assigns the identifier set in the memory management device and caches an entry of the page table related to the address set in the memory management device in the translation look-aside buffer.

14. The information processing apparatus according to claim 13, wherein an operating system is configured to allocate the identifier for each of the operation modes with respect to the virtual address space and notify the identifier management device of the relevant identifier.

15. The information processing apparatus according to claim 13, wherein at least one processor executes:
- accepting identification information on a domain that is a sorting device of the entry of the page table from the operating system and setting the second access right indicating the value for validating the first access right in the memory management device with regard to the domain that is local to which only a local page belongs,
- wherein the accepting addresses of respective page tables generated includes accepting an address of a page table generated for each of combinations of the operation modes and the domains,
- wherein the switching includes setting, in accordance with the switch of the operation mode, the address of the page table in which the entry related to the local domain is different with respect to the page table in which the address is set in the memory management device and the entry related to the domain that is global to which a global page belongs is common and the identifier corresponding to the second operation mode at a switch destination in the memory management device and setting the second access right indicating a value smaller than or equal to the value of the first access right corresponding with the global domain in the memory management device,
- wherein the setting of the address corresponding to the second operation mode includes setting, in accordance with the memory access beyond the second access right, an address of the page table in which the entry related to the local domain is common and the entry related to the global domain is different in the memory management device, causing the memory management device to execute the flush of the translation look-aside buffer, and setting the second access right indicating the value for validating the first access right in the memory management device with regard to the global domain, and
- wherein the memory management device assigns the identifier set in the memory management device and caches the entry of the page table related to the address set in the memory management device in the translation look-aside buffer with regard to the page related to the local domain, and controls the memory access while the second access right for each domain is prioritized.

* * * * *